(12) United States Patent
Pastuszak et al.

(10) Patent No.: US 11,974,171 B2
(45) Date of Patent: Apr. 30, 2024

(54) ANTENNA BLOCKAGE DETECTION AND MITIGATION

(71) Applicant: Panasonic Avionics Corporation, Lake Forest, CA (US)

(72) Inventors: Pawel Pastuszak, Mission Viejo, CA (US); Janet Lee King, Bothell, WA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 356 days.

(21) Appl. No.: 17/175,309

(22) Filed: Feb. 12, 2021

(65) Prior Publication Data

US 2021/0258834 A1 Aug. 19, 2021

Related U.S. Application Data

(60) Provisional application No. 62/977,101, filed on Feb. 14, 2020.

(51) Int. Cl.
| | |
|---|---|
| *H04W 4/42* | (2018.01) |
| *H04W 4/024* | (2018.01) |
| *H04W 36/00* | (2009.01) |
| *H04W 36/22* | (2009.01) |

(52) U.S. Cl.
CPC ....... *H04W 36/0016* (2013.01); *H04W 4/024* (2018.02); *H04W 4/42* (2018.02); *H04W 36/00837* (2018.08); *H04W 36/22* (2013.01)

(58) Field of Classification Search
CPC ... H04W 36/0016; H04W 4/024; H04W 4/42; H04W 36/00837; H04W 36/22; H04W 36/32
See application file for complete search history.

(56) References Cited

U.S. PATENT DOCUMENTS

| | | | |
|---|---|---|---|
| 6,052,078 A * | 4/2000 | Waterman | H01Q 19/28 343/705 |
| 8,238,284 B2 | 8/2012 | Wilcoxson et al. | |
| 9,306,718 B2 | 4/2016 | Walton | |
| 9,572,080 B1 * | 2/2017 | Wang | H04W 36/18 |
| 9,793,979 B2 | 10/2017 | Yakubovitch et al. | |
| 2002/0099481 A1 * | 7/2002 | Mori | G05D 1/027 318/587 |
| 2013/0343241 A1 * | 12/2013 | Niu | H04W 72/0446 370/280 |

(Continued)

*Primary Examiner* — Lester G Kincaid
*Assistant Examiner* — Dung L Lam
(74) *Attorney, Agent, or Firm* — Perkins Coie LLP

(57) ABSTRACT

A vehicle communication system includes a network adaptor that communicates with a communication network, a communication interface that communicates with multiple vehicles via multiple satellites, each vehicle comprising an antenna system for coupling to the satellites. The vehicle communication system is configured receive route data of the vehicles, and, for each vehicle, determine a future position of the vehicle based on the route data; identify a satellite available for communications with the vehicle at the future position; predict whether an antenna blockage event will occur between the identified satellite and the antenna system of the vehicle at the future position; designate the identified satellite as having the antenna blockage event; and transmit instructions to the vehicle to not use the identified satellite.

21 Claims, 14 Drawing Sheets

(56) References Cited

U.S. PATENT DOCUMENTS

| | | | |
|---|---|---|---|
| 2015/0271730 A1* | 9/2015 | Benammar | H04B 7/195 455/436 |
| 2016/0150451 A1* | 5/2016 | Barreto De Miranda Sargento | H04W 36/30 370/332 |
| 2019/0363930 A1* | 11/2019 | Shreshthi | H04W 28/021 |
| 2020/0008122 A1* | 1/2020 | Radko | H04W 36/32 |
| 2021/0258834 A1* | 8/2021 | Pastuszak | H04W 4/42 |

\* cited by examiner

ANTENNA BLOCKAGE DETECTION AND MITIGATION

CROSS-REFERENCE TO RELATED PATENT APPLICATIONS

The present document claims the benefit of priority of U.S. Provisional Patent Application No. 62/977,101, entitled "Decision Engine (Antenna Blockage)" filed on Feb. 14, 2020. The entirety of the provisional patent application is incorporated herein by reference.

BACKGROUND

Technical Field

The present disclosure relates generally to vehicle communication systems, and more particularly to real time monitoring of positions to mitigate interruptions in connectivity between vehicles and a vehicle communication system.

Related Art

Radiation from a vehicle mounted line-of-sight radio communications antenna, for example a SATCOM antenna, may be blocked by vehicle structures in certain directions, dependent on the vehicle type and the location of the antenna. The scattering of the signal due to structural blockage may lead to non-compliant radiation causing interruptions in services relying on that communications link. The connectivity may be interrupted intermittently or possibly continuously when the vehicle's trajectory or attitude results in an extended structural blockage.

The current technology to determine if the antenna had been in blockage is to through the use of post-flight logs offload from the vehicle to calculate the blockage events that occurred. However, during the time of blockage and during flight the system still experiences outages.

Additionally, current technology monitors for blockage at the vehicle. Vehicle side monitoring results in a narrow and singular view of blockage situations and network usage.

For the reasons stated above and for other reasons stated below which will become apparent to those skilled in the art upon reading and understanding the specification, there is a need in the art for alternate systems and methods for providing vehicle connectivity continuity.

The present disclosure is directed toward overcoming one or more of the problems identified above and/or providing advantages over prior systems.

SUMMARY

A vehicle communication system is disclosed herein. The vehicle communication system comprises a network adaptor configured to communicate with a wireless communication network, at least one communication interface configured to communicate with a plurality of vehicles via a plurality of communication connectivity systems of a vehicle communication network, each vehicle comprising an antenna system for communicatively coupling to the plurality of communication connectivity systems; and at least one processor communicatively coupled to at least one memory storing executable instructions. The at least one processor is configured to execute the executable instructions to receive route data of the plurality of vehicles, the route data comprising at least a current position of the plurality of vehicles, and, for at least one vehicle of the plurality of vehicles, determine a future position of the vehicle based on the route data; identify a communication connectivity system of the plurality of communication connectivity systems available for communications with the vehicle at the future position; predict whether an antenna blockage event will occur between the identified communication connectivity system and the antenna system of the vehicle at the future position; designate the identified communication connectivity system as having the antenna blockage event; and transmit instructions to the at least one vehicle to not use the identified communication connectivity system for communications with the vehicle communication network. In various embodiments, the at least one processor is located at a ground based system.

In another aspect, a method for or providing a vehicle communication network is disclosed herein. The method comprises receiving route data of a plurality of vehicles, the route data comprising at least a current position of the plurality of vehicles, where each vehicle comprises an antenna system for communicatively coupling to a plurality of communication connectivity systems of a vehicle communication network. The method also includes, for at least one vehicle of the plurality of vehicles, determining a future position of the vehicle based on the route data; identifying a communication connectivity system of the plurality of communication connectivity systems available for communications with the vehicle at the future position; predicting whether an antenna blockage event will occur between the identified communication connectivity system and the antenna system of the vehicle at the future position; designating the identified communication connectivity system as having the antenna blockage event; and transmitting instructions to the at least one vehicle to not use the identified communication connectivity system for communications with the vehicle communication network.

In another aspect, a non-transitory computer readable medium having stored therein a program for making a computer execute a method for providing a plurality of vehicles with communication services over a vehicle communication network is disclosed herein. The method comprises receiving route data of the plurality of vehicles, the route data comprising at least a current position of the plurality of vehicles, where each vehicle comprises an antenna system for communicatively coupling to a plurality of communication connectivity systems of the vehicle communication network. The method also includes, for at least one vehicle of the plurality of vehicles, determining a future position of the vehicle based on the route data; identifying a communication connectivity system of the plurality of communication connectivity systems available for communications with the vehicle at the future position; predicting whether an antenna blockage event will occur between the identified communication connectivity system and the antenna system of the vehicle at the future position; designating the identified communication connectivity system as having the antenna blockage event; and transmitting instructions to the at least one vehicle to not use the identified communication connectivity system for communications with the vehicle communication network.

Other advantages and benefits of the disclosed system and methods will be apparent to one of ordinary skill with a review of the following description.

BRIEF DESCRIPTION OF THE DRAWINGS

The various features will now be described with reference to the drawings of the various aspects disclosed herein. In the drawings, the same components may have the same reference numerals. Note that the drawings are not intended to be to scale or show actual quantities of components or relative sizes. The illustrated aspects are intended to illustrate, but not to limit the scope of disclosed techniques. The drawings include the following Figures.

DETAILED DESCRIPTION

Figure 1:
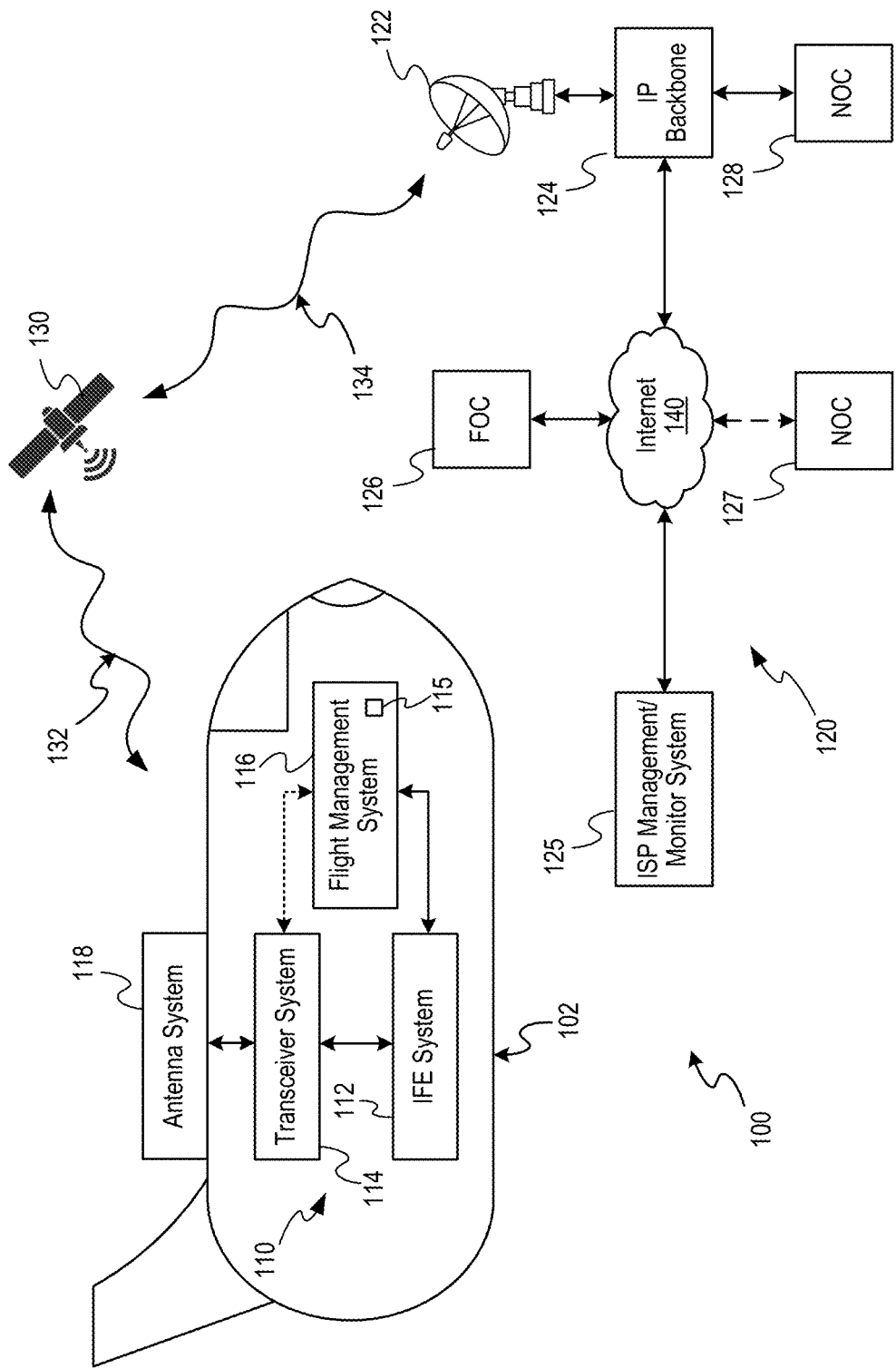
FIG. 1 is a schematic diagram of a vehicle communication system.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

The terms "environment," "platform," "component," "module," "system," and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

The term "vehicle" is illustratively used herein to refer to an aircraft, but the term is not to be so limited. It will be appreciated that the term "vehicle" may refer to any and all types of transportation vehicles including, but not limited to, personal transportation vehicles (e.g., automobiles, boats, motorcycles, etc.) and vehicles of common carriers, such as airplanes, passenger trains, buses, cruise ships, sightseeing vehicles (e.g., ships, boats, buses, cars, etc.), or any other moving vehicle.

As used herein, a position may refer to both geographic position (e.g., longitude and latitude coordinate), and orientation (e.g., pitch, yaw, and roll) of a vehicle. As used herein, yaw may be referred to as heading and vice versa.

The term "flight data" or "route data" is illustratively used herein to refer to data representative of a route, path, or trajectory traveled by an aircraft, but the term is not to be so limited. It will be appreciated that the term "flight data" may refer to data representative of any and all types of or vehicular movement, for example, a ground based or nautical travel, or any other types of vehicle movement.

As used herein inflight entertainment (IFE) system(s) may refer to system(s) capable of providing vehicle entertainment services without connectivity, while inflight entertainment and communication (IFEC) system(s) may refer to system(s) capable of providing vehicle entertainment services and connectivity services (e.g., services such as Internet browsing, text messaging, cell phone usage (where permitted), and emailing). However, embodiments described herein are equally applicable to both IFE and/or IFEC systems (collectively referred to herein as an IFE system). Example IFE connectivity service providers include, but are not limited to, Zodiac Inflight Innovations, Thales Avionics, Viasat, etc., and example IFEC connectivity service provides include, but are not limited to, Gogo® Inc., Boingo Wireless, Sitaonair, Panasonic Avionics Corp., Inmarsat plc, etc.

References throughout this specification to "an embodiment" or "an implementation" mean that a particular feature, structure, or characteristic described in connection with the embodiment is included in at least one embodiment or implementation. Thus, appearances of the phrase "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or passenger control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application. Similarly, the various processes and methods described herein may be described with reference to flow charts having process blocks illustrated in a particular sequence. However, the example implementations are not limited to the particular sequence illustrated. Example implementations may include actions being ordered into a different sequence as may be apparent to a person of ordinary skill in the art or actions may be performed in parallel or dynamically, without departing from the scope of the present application.

FIG. 1 is a schematic diagram of a vehicle communication system 100, in accordance with various aspects of the present disclosure. The vehicle communication system 100 comprises an airside based communication system 110 (referred to herein as airside system 110) and a ground based communication provider system 120 (referred to herein as ground side system 120). The airside system 110 provides for bidirectional communication services to occupants of a vehicle 102 from the ground side system 120. In various embodiments, the ground side system 120 may provide a gateway to the Internet 140 or other wireless network. The various components that make up the airside system 110 and ground side system 120 may be implemented as one or more processing systems 1200, as described in connection to FIG. 12.

The airside system 110 comprises a communications device such as an antenna system 118, an IFE system 112, and a flight management system 116. The IFE system 112 is coupled to the antenna system 118 via transceiver system 114 to establish a bidirectional data link or signal 132 with one or more communication connectivity systems 130 to establish communication services for occupants of the vehicle 102. Services may include, but are not limited to, voice communications connectivity, internet connectivity, live television, internet television connectivity, high speed internet services, simultaneous internet and television, IPTV (internet protocol television) IP television streaming, among other communications services. In some embodiments, IFE system 112 may be coupled to the flight management system 116 and receive flight plan and flight plan updates (collectively "flight data") from the flight management system 116. In some implementations, the flight management system 116 may provide and/or receive the flight data directly to the antenna system 118, via the transceiver system 114, for uploading and/or downloading from a ground side system 120. The flight management system 116 may comprise or otherwise be coupled to a vehicle control terminal 115 (referred to herein as terminal) for controlling the vehicle in accordance with the flight data. Terminal 115 may be a modem capable of connecting to ground side system 120 via the communication connectivity system 130. For example, in satellite systems the terminal 115 may be a line-replaceable unit (LRU) device, a radio-frequency (RF) device, or the like.

Although airside system 110 is described by way of example for providing communications aboard an aircraft, it should be appreciated that airside system 110 may be implemented in other vehicles that travel along a planned route. As the terms are used herein, a route or travel plan may refer to route plans that specify a path the vehicle 102 is expected to travel in three-dimensional space (heading/track data and vertical plan profile), as well as at the points in time at which the vehicle is expected to be at a given waypoint along the path. For example, in some implementations, the planned route comprises a time-correlated flight plan that indicates every turn or other maneuver an aircraft is planned to make, and tracks the aircraft's progress along a planned trajectory including altitude, heading, and speed parameters, and the expected time of arrival to a given waypoint. In some embodiments, the flight plan may be based on a 4-Dimensional Trajectory Based Operation ("4D-TBO") Air Traffic Management (ATM) protocol implemented using an ATM server and ATM bus.

Communication connectivity system 130 may provide for wireless bidirectional communications between vehicle 102 and the ground side system 120, for example, through the data links 132 and 134. In some embodiments, the bidirectional communication may be a bidirectional communication link over the Internet 140 or other wireless communication protocol. Airside system 110 thereby can receive data from a remote source and/or transmit (upload) content via data links 132 and 134, including flight data, system commands, and information from ground side system 120. Access to the Internet 140 may be made by using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols.

The communication connectivity system 130 may comprise a satellite communication system (e.g., SATCOM). Example satellite systems include, but are not limited to, geostationary (GEO) satellites, low earth orbit (LEO) satellites, medium earth orbit (MEO) satellites, high-altitude pseudo-satellite (HAPS) systems, etc. Although satellite communication devices are provided as examples, other embodiments with other radio communications technologies incorporated are envisioned as within the scope of the present disclosure, such as, but not limited to air-to-ground (ATG) radio; Aircraft Ground Information Systems (AGIS); Aero MACS communications; 3G, 4G, or 5G cellular networks; or NAVCOM avionics radio devices. With respect to SATCOM, various implementations may comprise, but are not limited to Ka, Ku, or L, Iridium devices, or combinations thereof. As used herein, the communication connectivity system 130 may be referred to as satellite system 130; however, although communication connectivity system 130 is described by way of example as a satellite system, it should be appreciated that communication connectivity system 130 may be implemented as any other communication system providing bidirectional communication services to a moving vehicle.

To facilitate communications, airside system 110 includes the antenna system 118 and transceiver system 114. The antenna system 118 may be disposed outside of vehicle 102, such as an exterior surface of a fuselage of the vehicle 102. The antenna system 118 can receive data signals from the ground side system 120 via an established communication link with the satellite system 130 and provide the data, as processed by the transceiver system 114, to the IFE system 112 and/or the flight management system 116. The transceiver system 114 can receive the data from the antenna system 118 via link 132 and can demodulate the signals. Upon demodulating the data, the transceiver system 114 can provide the demodulated signals to the IFE system 112 and/or flight management system 116 for distribution.

The airside system 110 is shown and as being in communication with an exemplary ground side system 120. The airside system 110 and the ground side system 120 communicate via the satellite system 130. The ground side system 120 may include an Internet Protocol (IP) backbone system 124 coupled to a transceiver hub system 122. The transceiver hub system 122 may comprise a satellite transceiver hub that provides link 134 with a satellite system implemented as the satellite system 130. Transceiver hub 122 may be a base station providing communication access to the Internet 140 for a geographic coverage area corresponding to the transceiver hub 122. Example transceiver hubs include, but are not limited to, 5G non-terrestrial network gNB stations, 4G-LTE eNB, 3G NodeB, or the like.

The ground side system 120 may be capable of providing direct broadcast satellite communication and data services, for example implemented as a network management system (NMS). The ground side system 120 may be configured to communicate with the Internet 140, including the World Wide Web as well as other services such as data services, direct broadcast television program, telephone, facsimile, email, weather, ADS-B (Automatic Dependent Surveillance Broadcast) data, ADS-B satcom data, other services, and the like. In some embodiments, the ground side system 120 may comprise a core network for providing cellular network access to the internet 140, such as a 3G, 4G LTE, 5G, etc.

The ground side system 120 illustratively comprises at least one network operations center (NOC) 128. The NOC 128, for example, comprises a physical and logical hub for the ground side system 120. Providing fully managed network services, the NOC 128 forms a gateway to the Internet 140 and other public telecommunication networks that can communicate with off-network destinations, such as an Internet Service Provider (ISP) management (or monitoring) system 125 and flight operations center (FOC) 126. The FOC 126 provides for ground control and operation services as well as communications between ground based flight control and the vehicle 102. In various embodiments, the FOC 126 may provide flight plan data and updates to the vehicle through the bidirectional communication link 132 and 134. The FOC 126 may also download flight plan data from the vehicle 102 during travel, such as supplied from the flight management system 116.

The NOC 128 may also manage (or monitor) operating parameters, such as operating mode and/or usage, of the vehicle communication system 100. In some embodiments, ground side system 120 can include a second NOC 127 accessed via internet 140 that may perform the same or similar functions as the NOC 128 and/or provide support to the NOC 128. While reference herein is made to NOC 128, it will be appreciated that the description applies to either and/or both of NOC 128 and NOC 127.

The NOC 128 centralizes monitoring and operations of the vehicle communication system 100. Thereby, the elements of the ground side system 120 can be readily reconfigured in response to failures, outages, performance bottlenecks, loading balance objectives, and other network control requirements. The NOC 128 likewise can provide for operator monitoring of radio frequency (RF) return link status, frequency, data rate assignments, and power levels on a per-mobile platform basis. The NOC 128 also can calculate demanded bandwidth, report to the service provider, and re-configure the satellite linking bandwidth.

Furthermore, the ground side system 120 can provide monitor for beam switch conditions to effectuate a handover and perform antenna blockage mitigation in accordance with embodiments herein. For example, the NOC 128 and/or FOC 126 or a separate component of the ground side system 120 may be configured to monitor for beam switch conditions, effectuate a handover, and perform antenna blockage mitigation in accordance with embodiments herein. The ground side system 120 provides for minimizing service interruptions by predicting and mitigating blockages between the antenna system 118 and communication connectivity system 130. For example, line of sight communications between antenna system 118 and the satellite system 130 may be blocked by objects in certain directions, thereby impacting communications between the vehicle 102 and the satellite system 130. Such blockages are referred to herein as antenna blockages. Antenna blockages may be due to a structure or object attached to the vehicle 102 (e.g., a tail of an aircraft, exhaust pipe of an aquatic vehicle, or other structure associated with a traveling vehicle), natural structures (e.g., mountains, vegetation, weather patterns, etc.), unnatural structures (e.g., buildings, statues, and other manufactured or other human-constructed structures), and the like intersecting with link 132 between the antenna system 118 and the satellite system 130. An exemplary antenna blockage is a result of a tail of an aircraft that blocks the antenna system 118 from establishing a line of sight link 132 with satellite system 130 based on the location of the tail relative to the antenna system 118. The relative location therebetween may cause a blockage at a specific evaluation angles and azimuth angles that the antenna system 118 is to be steered in order to establish the line of sight link 132. Conventional systems determine whether an antenna blockage has occurred using post-flight logs offloaded from the flight management system 116 to calculate the antenna blockage events following the occurrence. However, during flight and at the time of blockage, the communication services are interrupted and outages may occur.

Embodiments herein are configured to predict and mitigate (or avoid) antenna blockage events. For example, embodiments herein provide for monitoring current flight data and, if a handover situation is required within a time-to-go (TTG) threshold, performing antenna blockage mitigation to detect an antenna blockage event, and designating the beam as having an antenna blockage event. The designated beam is then removed from the handover analysis and is not used in the switch over determination. In some embodiments, the antenna blockage mitigation includes determining parameters of predicted antenna blockages (e.g., azimuth and elevation), and if the parameters are above corresponding thresholds (which may be any threshold as desired by the operator) designating the beam as having an antenna blockage event.

As used herein, TTG may refer to a measure of an amount of time until the antenna system 118 is no longer within a coverage region of a given satellite system 130. Thus, TTG may define an amount of time until the vehicle 102 is no longer able to maintain link 132 with the satellite system 130 for providing communication services.

Additionally, embodiments herein are configured to minimize a number of handovers while the vehicle 102 crosses between multiple satellite systems 130 coverage regions. For example, embodiments herein are configured to utilize the future position predictions to predict future covering beams of various satellite systems. Based on the predictions, the ground side system 120 can minimize the number of handovers by identifying which of the future covering beams will not result in a subsequent handover within a tracking time window, thus improving prediction of beam switching from one to another.

Furthermore, embodiments here provide for a ground side system 120 configured to select a beam for supplying communications services based on utilization of the beam. For example, the ground side system 120 is configured to examine utilization of multiple beams and identify the beam having the lowest utilization. The ground side system 120 may then switch communications to the lower utilized beam, so to load balance the usage across the entire network.

A non-limiting benefit of the embodiment of the ground side system 120 as described herein is the ability to perform the calculations network wide to improve the utilization and balance of across the entire network. For example, the ground side system 120 communicates with a plurality of vehicles (e.g., an entire fleet) and can balance across the fleet, instead of at the vehicle only. Conventional systems merely offered a narrow, singular vehicle based approach. Furthermore, the ground side system 120 may offer greater computer resources and data management, thereby improving processing times. For example, airside determinations at the vehicle may take upwards of 3 minutes or more initiate and select a beam for handover, whereas the ground side system 120 herein may be able to perform similar determinations in less time, for example, 10 seconds or less.

Figure 2:
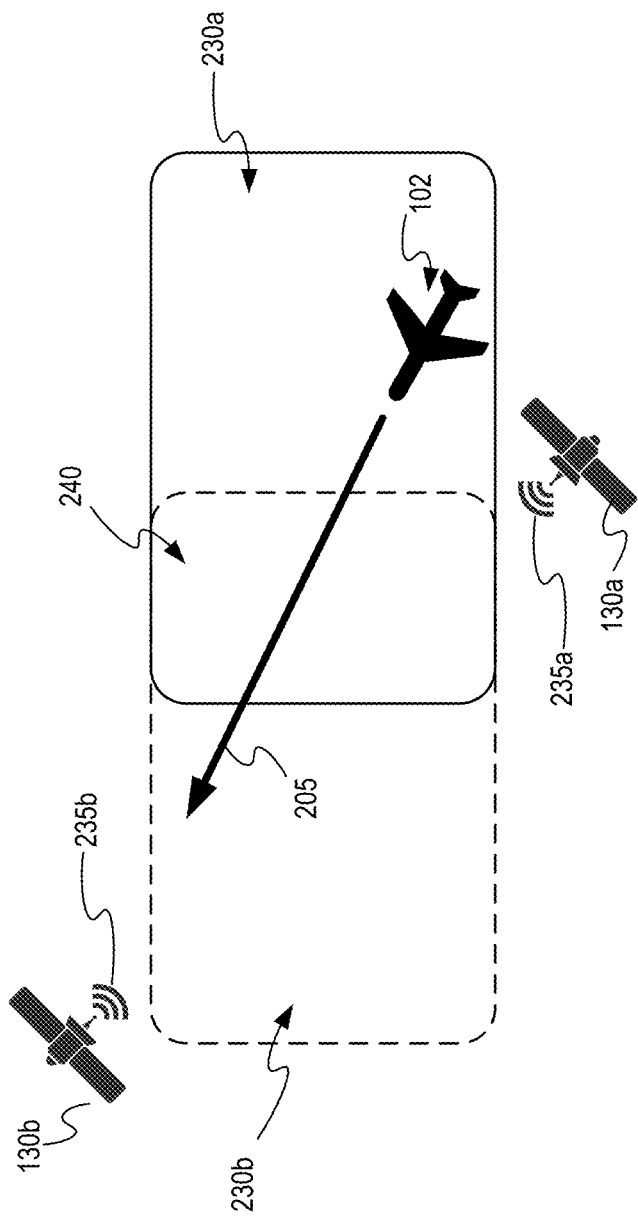
FIG. 2 illustrates a schematic diagram of communications between a vehicle and communication connectivity systems.

FIG. 2 illustrates a schematic diagram of communications between a vehicle 102 and satellite systems 130a and 130b. FIG. 2 depicts a flight plan 205 for vehicle 102 and two satellite systems 130a, 130b present along the flight plan 205. While the example herein illustrates two satellite systems, it will be appreciated that any number of satellite systems may be present along the flight plan and FIG. 2 is provided merely as an illustrative example. Additionally, flight plan 205 is an illustrative visual representation of flight plan data as described herein, and is provided for illustrative purposes only. The flight plan 205 includes a plurality of future waypoints (not shown) that are based, in part, on a current position (e.g., geographic coordinates), current heading, current orientation (e.g., pitch, roll, and yaw), and current ground speed of the vehicle 102.

Each satellite system 130a, 130b is capable of communications within a three-dimensional physical coverage region 230a, 230b, respectively, that is based, in part, on the type of satellite implemented (e.g., GEO offer larger coverage areas and HAPS offer smaller coverage areas). Thus, each satellite system 130a, 130b provides communication services to vehicles within the coverage region 230a, 230b (e.g., via a beam or link 132 of FIG. 1). When the vehicle 102 is within a coverage region 230 of a given satellite system 130, if line-of-sight beam connection is possible, the antenna system 118 communicatively couples to the given satellite system 130 and the airside system 110 can exchange data signals with the ground side system 120. The vehicle 102 can enter and exit the coverage regions of multiple satellites as the vehicle 102 moves relative to the satellite systems; and/or as the satellite systems move relative to the vehicle 102. For example, at a first instance (as shown in FIG. 2) the vehicle 102 may be within the coverage region 230a of satellite system 130a and thus exchanges communications via a first beam 235a. As the vehicle 102 travels along flight path 205, the vehicle 102 may exit the coverage region 230a. The ground side system 120 may determine that the duration of time until exiting coverage region 230a is below the TTG threshold and initiate a handover operation from satellite system 130b (see, e.g., FIGS. 8A and 8B).

The vehicle 102 may also begin to enter the coverage region 230b of satellite system 130b, which may overlap with coverage region 230a at overlap region 240. While the vehicle 102 is within this overlap region 240, the antenna system 118 detects beams 235a, 235b from satellite systems 130a, 130b, and switch communications from satellite system 130a to satellite system 130b via a handover operation.

However, in some situations, an antenna blockage event between the antenna system 118 and the satellite system 130b may occur during and/or following the handover. In this case, switching the antenna system 118 to satellite system 130b may result in an interruption of services due to the antenna blockage event. Thus, it would be desirable to either delay handover until the antenna blockage event no longer exists (keeping communications on the current satellite system) and/or handover communications to another satellite system (not shown in FIG. 2) that does not result in an antenna blockage event. In some embodiments, the signal quality of the blocked beam may be stronger (e.g., possess a higher received signal strength indicator (RSSI)) than a non-blocked beam and/or current beam, but the predicted antenna blockage event would result in service interruptions or impairments.

Accordingly, embodiments herein provide for predicting and mitigating antenna blockage events by monitoring current flight data related to the flight path 205 and predicting future positions, such as waypoints and orientations, of the vehicle 102. Based on monitoring the flight plan, the ground side system 120 herein can determine when the vehicle 102 will exit a coverage region and if that amount of time is equal to or less than the TTG threshold, and then initiate a handover of communications. The ground side system 120 predicts a plurality of future waypoints along the flight path 205 and a vehicle orientation (e.g., pitch, yaw and/or roll, along with heading) of each waypoint and, based on the future waypoints and vehicle orientations, predicts a plurality of available beams for establishing communications at each waypoint. For each available beam, the ground side system 120 then determines whether an antenna blockage event will occur and removes the beam from the available beams. Once removed, the ground side system 120 may select one of the remaining beams along the flight path 205, if any, to effectuate the handover and transmit the handover instructions to the airside system 110 via the current satellite system 130.

In various embodiments, the ground side system 120 monitors the flight data in real-time to predict future waypoints and orientations within a tracking time window. For example, ground side system 120 may continuously execute antenna blockage mitigation at a desired time interval and update the future positions and available beams accordingly. In some implementations, the time interval may be approximately 45 seconds.

The ground side system 120 continuously determines a state of the vehicle 102. The state of the vehicle 102 may include, but is not limited to, a stationary state where the vehicle is determined to not be traveling or moving; a taxiing state where the vehicle is traveling from airport terminal to a runway, or vice versa; a climb state where the vehicle is climbing in elevation; a descend state where the vehicle is descending in elevation; a turn state where the vehicle is changing in azimuthal direction, pitch direction, roll direction, and/or yaw direction; and a straight and level state where the vehicle is traveling at a constant elevation, azimuth, pitch, roll, and/or yaw. Other example states include arrival at a destination that is less than an arrival threshold (e.g., a threshold distance and/or time period until the vehicle arrives at the destination) and beam TTG minimum threshold (e.g., a minimum threshold period of time until the vehicle exits a coverage region of a current satellite system). The vehicle may be in one or more states at any given point along a travel path; for example, the vehicle may be in a turn state as well as a climb and/or descend state.

In various embodiments, based on the determined state, the ground side system 120 determines that antenna blockage mitigation is enabled. For example, the antenna blockage mitigation may only be enabled when the state of the vehicle is determined as straight and level, because predictions of future positions based on straight and level flight data are reliable. Whereas, during climb, descend and/or turn states, the constantly changing current flight data may induce instability and unreliability in the predictions, for example, due to constantly changing input parameters. Furthermore, if arrival at a destination is expected shortly, then handover may not be necessary and the antenna blockage mitigation is unnecessary. Similarly, when stationary and/or taxiing, the antenna blockage mitigation is not necessary. However, this does not mean that the antenna blockage mitigation cannot be performed at the other states, only that a maximum benefit and reliably is achieved when flight data used to predict an antenna blockage event is generated when the vehicle is straight and level.

In various embodiments, the ground side system 120 may predict future positions for a set tracking time window. For example, the ground side system 120 may predict future waypoints and orientations for 15 minutes from a current location and orientation. Fifteen minutes is used herein as an example, and the tracking time window may be any desired amount of time. Additionally, in various embodiments, if an antenna blockage event is detected within the tracking time window, the ground side system 120 may remove the corresponding beam from the beam list if the antenna blockage event is predicted to occur within a blockage filtering threshold. For example, if the ground side system 120 detects an antenna blockage event within the 15 minute tracking window and that the antenna blockage event is predicted to occur within a five minute blockage filtering threshold, then the ground side system 120 removes the designated beam from consideration for handover and automatically looks for an alternative beam to prevent an service interruption. Five minutes is used herein as an example, and the blockage filtering threshold may be any desired amount of time.

In various embodiments, as part of selecting a subsequent satellite system to be handed over to, the ground side system 120 may utilize the predicted future positions to prioritize available beams based on the available beams that will result in the fewest subsequent switches. That is, the ground side system uses the future positions to estimate, for each available beam, whether another handover will be required and prioritizes the available beams based on the beam having the fewest subsequent handovers. Prioritizing the available beams in this way enables the ground side system 120 to deliver quality and uninterrupted service to occupants.

While embodiments herein are described in connection with a handover decision or operation, the scope of the disclosure herein is not to be limited as such and other implementations are possible. For example, embodiments herein may provide for mitigating antenna blockage events of a current satellite system. That is, while vehicle 102 is traveling within coverage region 230a, future positions may be predicted and used to predict whether an antenna blockage event is likely to occur with the current satellite system 130a. If an antenna blockage event is predicted, the ground side system 120 may initiate a handover decision to identify another available satellite system and remove the current satellite system from consideration.

Figure 3:
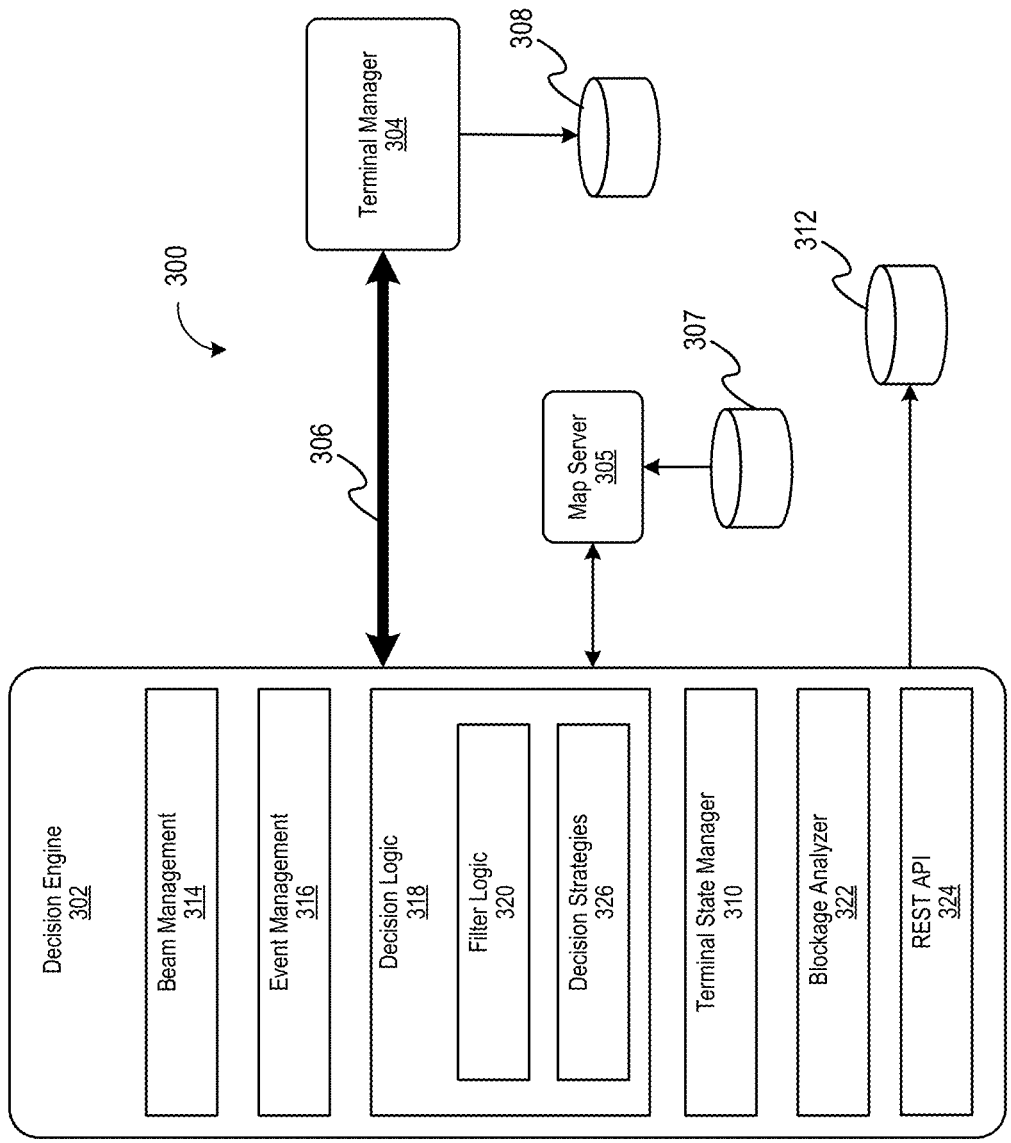
FIG. 3 illustrates an example schematic block diagram a connectivity decision system.

FIG. 3 illustrates a schematic block diagram a connectivity decision system 300, in accordance with various aspects of the present disclosure. The connectivity decision system 300 is configured to predict and mitigate antenna blockage events. In some embodiments, the connectivity decision system 300 may also be configured to execute a handover operation, for example, as described in connection to FIGS. 8A and 8B below. The connectivity decision system 300 may be included in the ground side system 120 of FIG. 1. For example, the connectivity decision system 300 may be part of the NOC 128, FOC 126, or other control center of the ground side system 120 or as a separate component of the ground side system 120. The connectivity decision system 300 and the components thereof may be implemented as one or more a processing system 1200 as described in connection to FIG. 12 below.

The connectivity decision system 300 comprises a decision engine 302 configured to initiate and perform handover operations with minimized interruption in connectivity. The decision engine 302 is communicatively coupled to a terminal manager 304 via an event data bus line 306. The bus line 306 and other references to bus lines as used herein may refer to Ethernet lines (100Base-T or faster) and/or fiber optic lines using simple network management protocol (SNMP) and/or proprietary protocol(s) to other types of controllers, such as maintenance controllers. In some embodiments, bus lines may be implemented as a MQ Telemetry Transport (MQTT) bus that uses MQTT messaging protocols. As used herein, communicatively coupled may refer to wired and/or wireless communication connections for retrieving and transmitting data between coupled components.

The terminal manager 304 may receive and/or retrieve flight data from remote terminals, such as terminal 115 of the flight management system 116 and/or a control center having a database (not shown) of flight data (e.g., the FOC 126). The terminal manager 304 is configured to process and aggregate the received flight data and output aggregated flight data for use by the decision engine 302.

The terminal manager 304 is also coupled to a blockage threshold database 308, which may be configured to store threshold data for use by the decision engine 302. The blockage threshold database 308 may store as plurality of threshold values for monitoring satellite connectivity and predicting antenna blockage events. For example, the blockage threshold database 308 may be configured to store the TTG threshold, threshold probability, arrival threshold, beam TTG minimum threshold, the blockage filtering threshold, the tracking time window, time intervals, etc. Each of the thresholds may be predetermined and inputted as desired by an operator of the connectivity decision system 300, via a user interface, the values of which may be based on computational resources and/or desired thresholding constraints.

Additionally, the blockage threshold database 308 stores antenna blockage azimuth thresholds and antenna blockage elevation thresholds for a plurality of vehicles. Each antenna blockage azimuth threshold and antenna blockage elevation threshold is based on a location of an antenna system (e.g., antenna system 118) relative to the object causing the antenna blockage event. For example, where the vehicle 102 is an aircraft and the object is the tail, the azimuth and elevation angles (e.g., the thresholds) for steering the antenna system of the aircraft that will result in blockage with the tail can be calculated based on the known dimensions and specifications of the antenna system, aircraft, and tail, along with the relative positions therebetween. The blockage threshold database 308 stores a plurality of antenna blockage azimuth and elevation thresholds, each corresponding to a vehicle (of a plurality of vehicles, such as a fleet of aircrafts). The blockage threshold database 308 may also store the thresholds in association with the unique vehicle ID, object ID (e.g., tail ID), and a vehicle type used to determine the thresholds.

While examples herein are provided with respect to antenna blockage due to a tail, it will be appreciated that antenna blockage azimuth thresholds and antenna blockage elevation thresholds may be determined for any type of blocking object. For example, antenna blockage azimuth thresholds and antenna blockage elevation thresholds for any blocking object attached to the vehicle may derived in a manner similar to the tail example described above. In another example, for objects external or remote from the vehicle (e.g., geographic structures, buildings, etc.) the antenna blockage azimuth thresholds and antenna blockage elevation thresholds may be derived based on determining the relative location between the remote object and the antenna system, for example, relative locations based on a comparison of geographic coordinates and altitude of the antenna system compared to the elevation of the object.

The decision engine 302 is also coupled to a blockage history database 312 configured to store antenna blockage events detected by the decision engine 302 for use in subsequent processing. The blockage history database 312 is configured to store historical data of antenna blockage events, which may be used for historical analysis. The blockage history database 312 stores data on an antenna blockage event basis, and includes, but is not limited to, time stamp (e.g., date and time) of the antenna blockage occurrence; unique vehicle ID; blockage object ID; beam ID of the blocked beam; origin of the vehicle (e.g., an airport code or origin place descriptor); destination of the vehicle (e.g., airport code or destination place descriptor); map version; longitude coordinate of orbital slot of satellite system corresponding to the beam; azimuth angle(s) resulting in blockage; elevation angle(s) resulting in blockage; and predicted duration of antenna blockage.

The decision engine 302 comprises a plurality of components that are abstractions representative of logical software components or modules for executing functions performed by the connectivity decision system 300. The decision engine 302 comprises a terminal state manager module 310, a beam management module 314, event management module 316, decision logic module 318, decision strategies 326, and filter logic module 320, blockage analyzer module 322, and REST application programing interface (API) module 324. The modules may comprise instructions defining a program, that when execute by a processor, cause the module to execute the functions defined therein. The modules may be one or more plug-ins that can be installed into the decision engine 302 for executing handover decisions.

The blockage analyzer module 322 comprises the hardware equipment and instructions for performing antenna blockage mitigation functions as described below in connection to FIGS. 4-7. The blockage analyzer module 322 checks for antenna blockage events based on a current beam and current route of travel. For example, the blockage analyzer module 322 receives flight data and a beam list; processes the received data to predict whether or not an antenna blockage event will occur for each beam of the beam list; and tags those beams that are predicted to have an antenna blockage event. In various embodiments, the blockage analyzer module 322 may check for antenna blockage events that will occur within a tracking time window. Additionally, in some implementations, the blockage analyzer module 322 may also tag those beams for which the detected antenna blockage is predicted to occur with a blockage filtering threshold. Blockage analyzer module 322 includes instructions for predicting antenna blockage events as part of the decision engine 302, and the output of the blockage analyzer module 322 is feed to the decision logic 318 and to the filter logic 320 and decision strategies module 326.

Figure 8A:
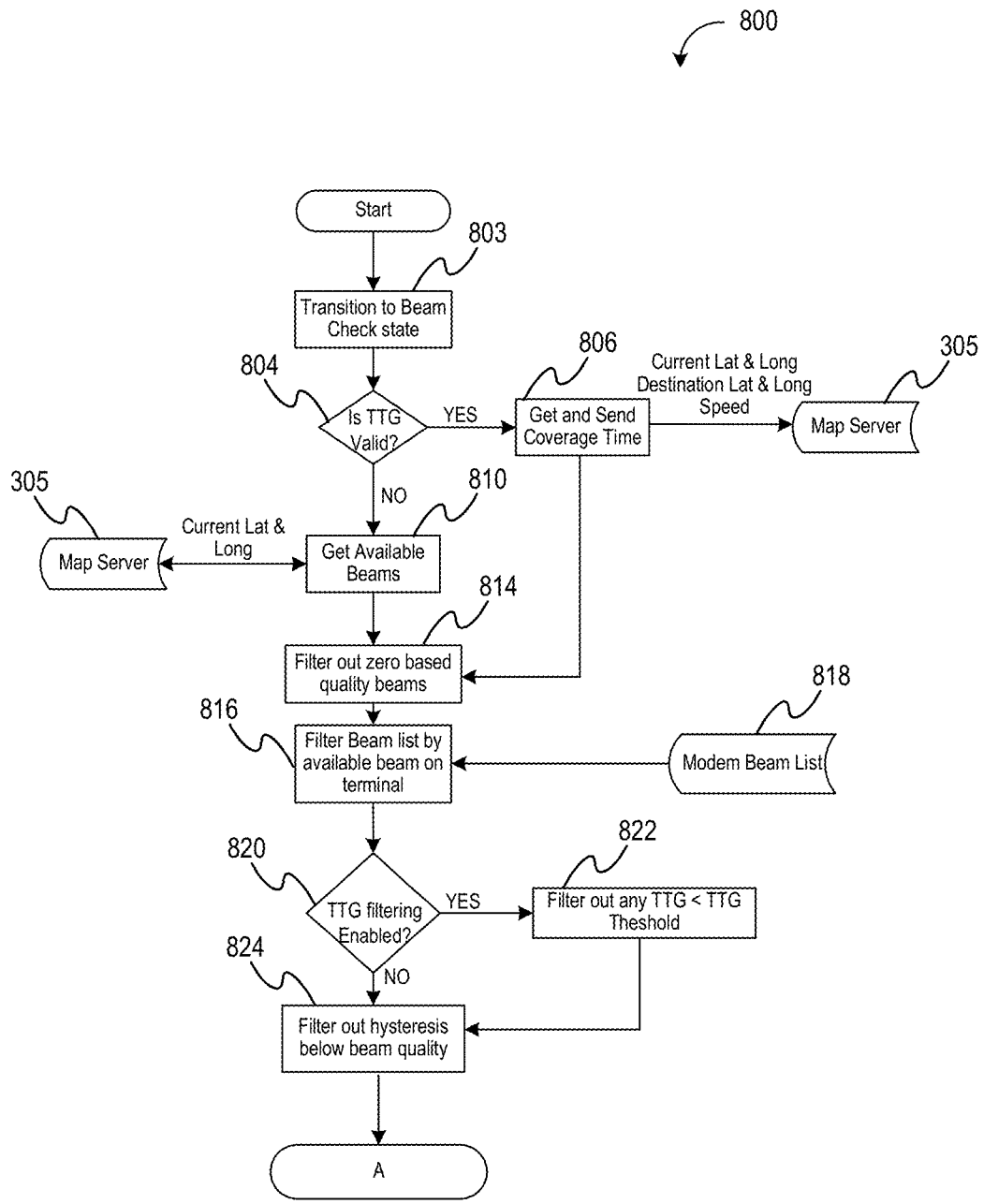
FIGS. 8A and 8B illustrate an example method flow for performed by connectivity decision system of FIG. 3.
Figure 8B:
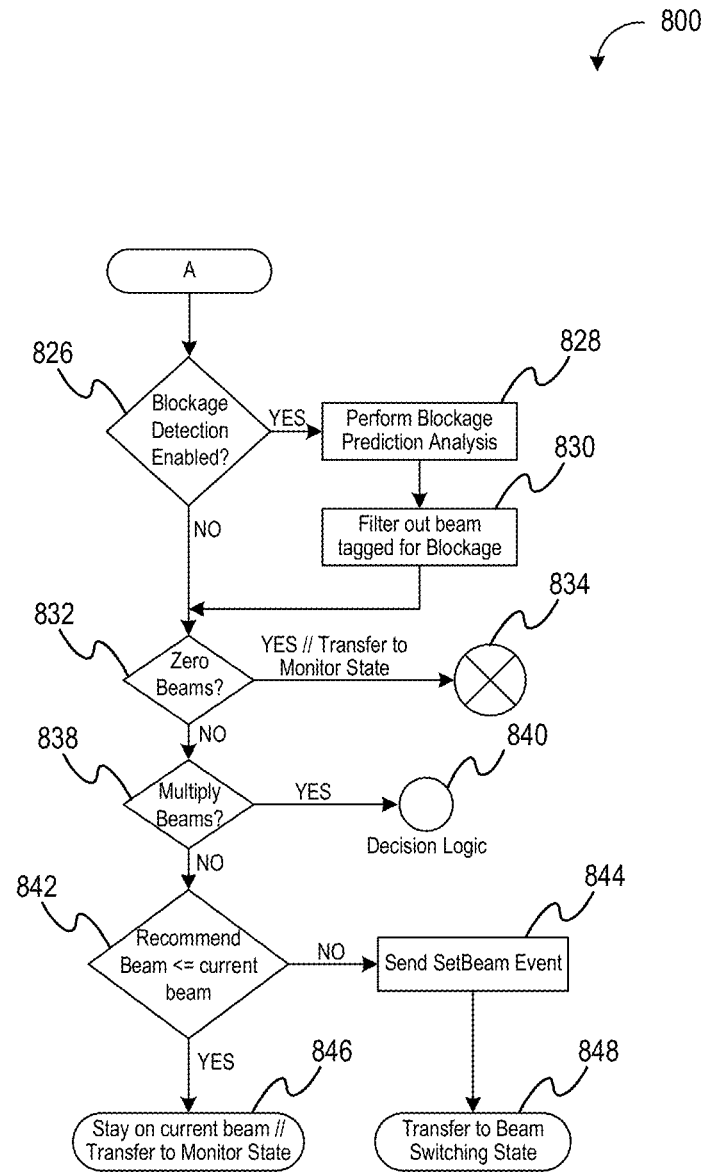

The decision logic module 318 is configured to perform handover operations. The decision logic module 318 continuously monitors the communications environment to detect a handover scenario and, when a handover scenario is detected, determines to switch to another beam and selects the beam from a plurality of available beams. FIGS. 8A and 8B illustrate an example method flow for executing a handover operation. As part of the handover, the decision logic module 318 retrieves antenna blockage results from the blockage analyzer module 322 (e.g., updated beam list with beams tagged that are predicted to have antenna blockage events) and uses the results to filter out those beams predicted to have antenna blockage events. In some embodiments, the decision logic module 318 may filter out those beams predicted to have an antenna blockage event within the filtering threshold. For example, the decision logic module 318 may filter out those beams that are predicted to have an antenna blockage event within the next 5 minutes. Alternatively, the filtering threshold may have been applied by the blockage analyzer module 322, as described above. The decision logic module 318 utilize the filter logic module 320 and decision strategies 326 for filtering instructions stored therein providing rules for selecting an available beam for a handover, which includes an instruction to filter beams based on the antenna blockage predictions.

The beam management module 314 manages and monitors an available beam list of beams available for handover. For example, the beam management module 814 may update the available beam list based on filtering and decision executed by the decision logic module 318. The beam management module 814 may also provide the beam list to one or more of the components of the decision engine 302 for processing and manipulation thereof.

The REST API module 324 may define the manner in which external systems interact with the connectivity decision system 300. REST may stand for Representational state transfer (REST) which provides a software architecture that defines a set of constraints to be used for providing interoperability between computer systems. REST API module 324 allows the requesting systems to access and manipulate textual representations of Web resources by using a uniform and predefined set of stateless operations. In the REST API module 324, requests made to a coupled system will elicit a response with a payload formatted in HTML, XML, JSON, or some other protocol.

The terminal state manager 310 may be configured to request flight data from the terminal manager 304 and ingest the flight data for use by the decision engine 302. In some embodiments, the terminal state manager may be configured to determine a state of the vehicle 102 based on flight data from the terminal manager 304.

The decision engine 302 may also be coupled to a map server 305 and a map database 307. The map server 305 may be configured to retrieve and provide map data to the decision engine 302, such as geographic coordinates of natural and unnatural structures. The map server 305 may also be configured to retrieve and provide satellite map data, such as longitude coordinates of orbital slots for satellite systems. The map data may be stored in the map database 307 and updated by an operator of the system. The map server 305 may store any type of coverage map that provides for the network coverage based on geographic coordinates (e.g., latitude and longitude coordinates) and this coverage map may be provided to the modules of the decision engine 302 (for example, the decision logic 318, blockage analyzer 322, etc.).

Figure 4:
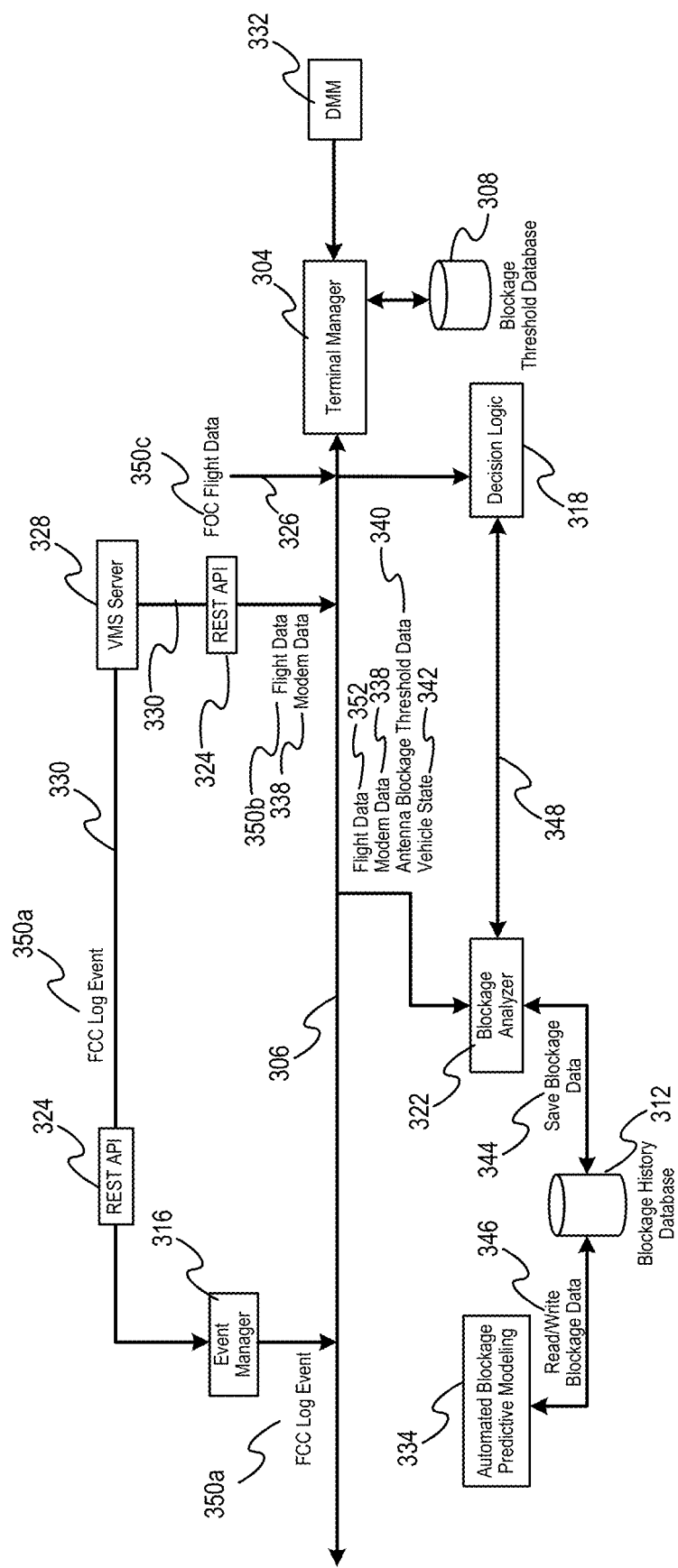
FIG. 4 illustrates an example diagram of interactions between the components of the connectivity decision system of FIG. 3.

FIG. 4 illustrates an example diagram of interactions between the components of the connectivity decision system of FIG. 3, in accordance with various aspects of the present disclosure. In the illustrative example, the terminal manager 304 receives flight data 350 from a plurality of flight data sources; aggregates the received data; and retrieves threshold data 340 from the antenna blockage threshold database 312. The terminal manager 304 then supplies aggregated flight data 352 and antenna blockage threshold data 340 to the decision logic module 318 and blockage analyzer module 322. The plurality flight data sources may comprise one or more of the FOC 126, digital measurement device(s) 332 (collectively referred to as DMM), and a vehicle messaging system (VMS) server 328. An example, vehicle messaging system is an aircraft messaging service (AMS) that couples the ground side systems to airside beam switch (ABS) systems included in the flight management system 116. The ABS system may effectuate the beam switch in accordance with instructions from the ground side system 120. The blockage analyzer module 322 utilizes the received data to predict antenna blockage events, designate beams having antenna blockage events, and transmits blockage data 344 to the blockage history database 312 for storage. The decision logic module 318 retrieves the designations from either the blockage analyzer module 322 and/or the blockage history database 312 to filter out beams in accordance with the decision strategies contained therein.

The terminal manager 304 may retrieve FOC flight feed data 350c from the FOC 126 via the flight feed bus line 326. The FOC flight feed data 350c may include a vehicle ID, blockage object ID (e.g., tail ID for van aircraft), departing location descriptor (e.g., airport code or other description), and destination location descriptor (e.g., airport code or other description). The flight feed bus line 326 may be coupled terminal manager 304 via the bus line 306.

The event management module 316 may retrieve FCC log event data 350a by utilizing the REST API module 324 through which the decision engine 302 may request data from the VMS server 328. The event management module 316 may forward the FCC log event data 350a to the terminal manager 304 via bus line 306. The event management module 316 may retrieve FCC log event data 350a at a set time interval. For example, FCC log event data 350a may be retrieved every five minutes; however other intervals that are longer or shorter are possible (e.g., every one minute, every 10 minutes, etc.). The interval may be based on desired frequency for data retrieval. The payload for each FCC log event data 350a may include an object attribute to identify the object that may result in antenna blockage. For example, in various embodiments, the payload may include a tail ID or tail Sign. The payload may be provided in JSON (JavaScript Object Notation) format or the like.

The payload of the FCC log event data 350a may also comprise a plurality of FCC log records generated at another set time interval and aggregated into the FCC log event data 350a. As an example, an FCC log record may be generated every 30 seconds of flight time by the vehicle 102, and communicated to the VMS server 328 via a link with a satellite system, with 10 FCC log records making up a single FCC log event data 350a. However, any generation interval for and number of records to be included in the FCC log event data 350a may be used. Each FCC record may comprise some of the information included in flight data (e.g., flight data 336), different information, or a combination thereof. In various embodiments, each FCC record comprises a time stamp of the date and time for each record along with pitch, roll, and yaw data of the vehicle 102 at each time stamp. Thus, in the illustrative example, a given FCC log event data 350a may comprise a plurality of temporally sequential FCC records, each comprising pitch, yaw, and roll data the pitch, yaw, and roll of the vehicle at the corresponding date and time.

The terminal manager 304 may also retrieve flight data 350b and modem data 338 from the VMS server 328 using the REST API module 324. The flight data 350b and modem data 338 may include, for example, the vehicle ID, beam ID of current beam, current latitude coordinate, current longitude coordinate, current heading, departing location descriptor, destination location descriptor, beam list of available beams, geographic map data, ground speed, etc. As used herein, modem data may include, but is not limited to, current position of terminal 115, antenna information and vehicle state. For example, modem data may include, but not limited to, latitude, elevation, longitude, pitch, roll, sat-long, polarization, heading, antenna tracking error in azimuth, antenna tracking error in elevation, equivalent isotropically radiated power (EIRP), transmission power, altitude, antenna type, transmission frequency, reception frequency, transmission bandwidth, azimuth, reception signal to noise ratio (SNR), transmission polarization reference, vehicle speed, vehicle altitude, and the like.

The terminal manager 304 may retrieve the flight data 350b and modem data 338 at set time intervals. For example, the flight data may be retrieved every 30 seconds and the modem data 338 retrieved one once (e.g., when the terminal 115 logs onto the network via the modem of the vehicle 102); however other intervals that are longer or shorter are possible. The intervals may be based on desired frequency for data retrieval. The flight data 350b may be associated with a time stamp of the data and time of retrieval, such that flight data 350b may be correlated and aggregated with the FCC log records of the FCC log event data 350a.

The terminal manager 304 may also receive flight data from the DMM 332. The DMM 332 may comprise one or more sensors, including, but not limited to, of an altimeter, speedometer or airspeed indicator from which ground speed can be extrapolated, vertical speed indicator, turn and bank indicator, attitude indicator, compass system, heading indicator, very-high frequency omnidirectional rang (VOR) indicator, nondirectional radio beacon (NDM) indicator, geographic coordinate indictors (e.g., a GPS system or other position indictor providing latitude and longitude coordinates). The DMM 332 may provide one or more pieces of the flight data 350b and may be in supplement to and/or in place of data from the VMS server 328.

The terminal manager 304 may extract certain pieces of received flight data 350; aggregate the flight data 350; and supply the resulting flight data 352 to the decision logic module 318 and/or blockage analyzer module 322. For example, as described below in connection to FIGS. 5 and 6, the terminal manager 304 may extract a set number of temporally sequential entries of data for a given data type and aggregate the entries to determine aggregated flight data. The terminal manager 304 may also retrieve the antenna blockage threshold data 340 from the blockage threshold database 308 and forward the blockage threshold data 340 to the blockage analyzer module 322 via bus line 306. Also, the terminal manager 304 may analyze the aggregated flight data, for example, to determine a vehicle state 342, which can be supplied the blockage analyzer module 322 via bus line 306. Additionally, modem data 338 may be communicated to the blockage analyzer module 322 and/or decision logic module 318 via bus line 306.

The blockage analyzer module 322 is configured to predict antenna blockage in real-time, as described in greater detail below in connection to FIG. 7. The blockage analyzer module 322 receives the aggregated flight data 352, modem data 338, antenna blockage threshold data 340, and vehicle state 342, which are analyzed for antenna blockage mitigation in real-time. If an antenna blockage event is detected for a given beam of interest, the beam is designated as having antenna blockage. For example, a tag or other designation may be associated with the beam ID in the beam list and stored in the blockage history database 312 via a save blockage data command 344. The beam list may be provided in response to a "Get Blockage Status" request 348 from the decision logic module 318 for use in executing a handover and selecting a proper beam for completing the handover.

The designated beam may be transmitted to the blockage history database 312 as a save blockage message 344 for use in subsequent mitigation algorithms. For example, the blockage analyzer module 322 may include an automated blockage predictive engine 334 that access historical blockage events stored in database 312. The automated blockage predictive engine 334 utilizes machine learning to progressively learn from the antenna blockage historical data stored in the antenna blockage history database 312. The automated blockage predictive engine 334 trains with one or many data sets available to predict a desired blockage outcome from a new or unknown set of data for the specific route and vehicle type. The machine learning algorithm is a supervised learning where a property (or known Blockage conditional parameters) is available for a certain dataset (training set), but is missing and needs to be predicted for other instances (e.g. different routes).

Figure 5:
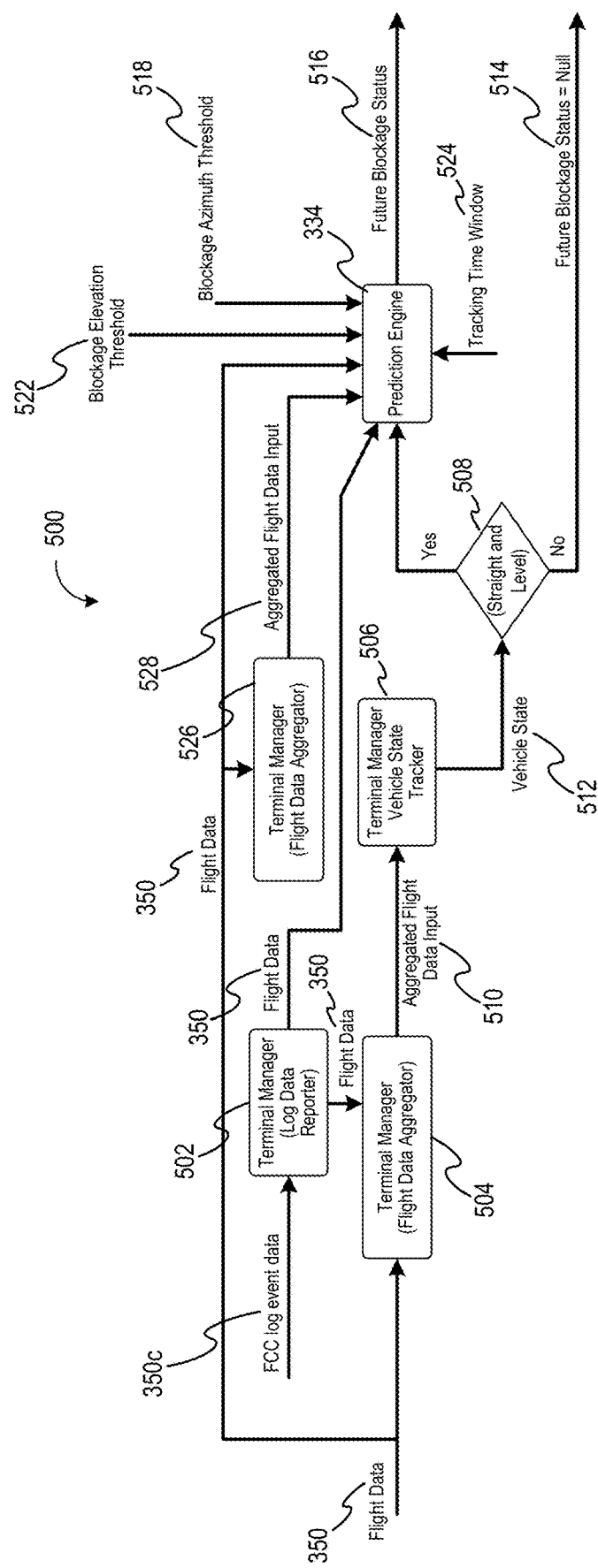
FIG. 5 illustrates an example block diagram of an antenna blockage mitigation processing sequence performed by the connectivity decision system of FIG. 3.

FIG. 5 illustrates an example block diagram of an antenna blockage mitigation processing sequence 500 performed by the connectivity decision system 300, in accordance with various aspects of the present disclosure. The various pathways of the sequence 500 may be executed in tandem, parallel, or in any given sequence. In the example of FIG. 5, various components of the terminal manager 304 are configured to abstract (e.g., simplify) or transform flight data 350 into an individual records that can be used as the inputs into a blockage prediction engine 334 of the blockage analyzer module 322. In the illustrative example, the terminal manager 304 comprises a FCC log data report 502, a flight data aggregator 504, a flight data aggregator 526, and a vehicle state tracker 506. The flight data aggregators 526 and 504 may be the same or different components of the terminal manager 304.

The terminal manager 304 receives the FCC log event data 350*a* at the FCC log data reporter 502. The log data reporter 502 decomposes the FCC log event data 350*a* into the individual FCC log records which are communicated to the blockage prediction engine 334 and the flight data aggregator 504.

Flight data aggregators may extract pieces of data and aggregate temporally sequential entries of flight data. That is, each instance of flight data 350 comprises a plurality of temporal sequential groupings of data, with each grouping associated with a time stamp and comprising an entry for one or more types of data (e.g., ground speed, altitude, roll, etc.). The flight data aggregators may extract a plurality of temporally sequential entries for a given type of data and aggregate the extracted entries to generate an aggregated data input for the given type of data. The flight data aggregators may do this for one or more types of data. In various embodiments, the define set of temporally sequential entries may be all entries within a time window (e.g., 90 seconds, 60 seconds, etc.) or a set number of temporally sequential entries (e.g., the most recent three entries, four entries, five entries, etc.).

The terminal manager 304 receives flight data 350 from the log data reporter 502 and/or other sources as described above in connection to FIG. 5. The flight data aggregator 504 extracts ground speed data, altitude data, and roll data from the received flight data 350 and aggregates a plurality of temporally sequential entries of the ground speed data; a plurality of temporally sequential entries of the altitude data; and a plurality of temporally sequential entries of the roll data.

Figure 6:
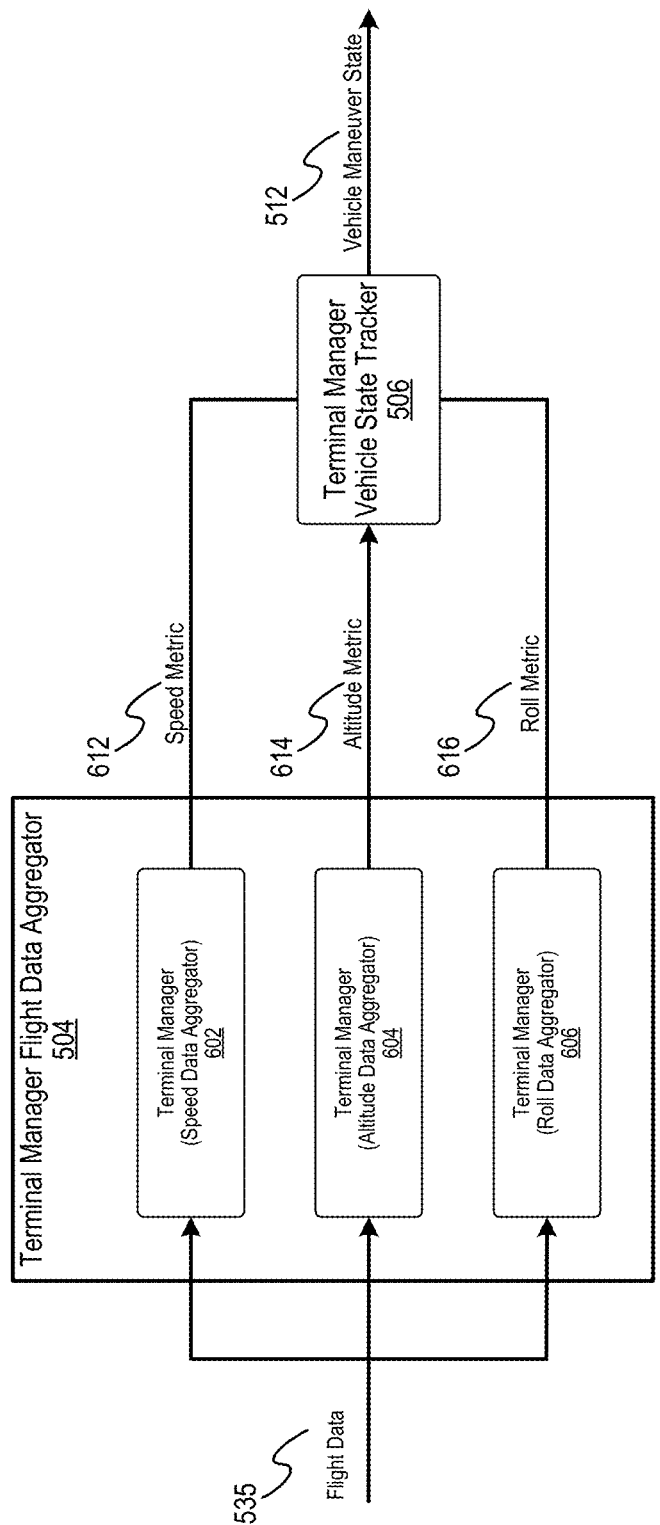
FIG. 6 illustrates an example vehicle state processing sequence of the antenna blockage mitigation processing sequence of FIG. 5.

For example, FIG. 6 illustrates an example vehicle state processing sequence 600 that may be performed as part of the sequence 500. For example, the flight data aggregator 504 may comprise speed data aggregator 602, an altitude data aggregator 604, and a roll data aggregator 606. The speed data aggregator 602 extracts a defined set of temporally sequential ground speed data entries and aggregates the ground speed data entries to generate a single aggregated flight data entry output as a speed metric 612. In various embodiments, the speed metric 612 may be determined by taking the mathematical mean of the temporally sequential ground speed entries. Similar, the altitude data aggregator 604 outputs an altitude metric 614 and the roll data aggregator outputs a roll metric 616. As an example, the altitude metric 614 may be determined by taking the mathematical mean of the difference between each of the temporally sequential altitude entries and the roll metric 616 may be determined by taking the mathematical mean of the absolute value of each of the temporally sequential altitude entries. While aggregating herein is described by using the mathematical mean, other methods of aggregation are possible, for example, a medium, average, or the like of the plurality of temporally sequential entries. While example methods of aggregation are provided herein, aggregation may be performed in any external way that is able to collect the data and derive a mathematical mean, medium, or average that the vehicle state tracker 506 can use. For example, the aggregation can run on the vehicle and the information could be provided with modem data.

Returning to FIG. 5, once aggregation is performed for each type of data, the flight data aggregator 504 outputs aggregated flight data input 510 to the vehicle state tracker 506. In some embodiments, the vehicle state tracker 506 may be executed by the terminal manager 304 and/or the terminal state manager 310 of the decision engine 302. The aggregated flight data input 510 may comprise each of the metrics 612, 614, and 616, which may be provided to the vehicle state tracker 506 are one or more transmissions.

The vehicle state tracker 506 analyzes the aggregated flight data input 510 and determines a vehicle state 512, including the vehicle states as described above. For example, the vehicle state tracker 506 may determine that the vehicle is stationary if the speed metric 612 is below a stationary speed threshold, for example, less than 0.01 mph (or other desired threshold). The vehicle state tracker 506 may determine that the vehicle is taxing if the speed metric 612 is between the stationary speed threshold and a taxi speed threshold, for example, equal to or greater than 0.01 mph and less than or equal to 135 mph. The vehicle state tracker 506 may determine that the vehicle 102 is taxing if the altitude metric 614 is less than an altitude threshold, for example, 10 feet (e.g., the mean difference in altitude data entries is less than 10 feet). A taxing state may be determined where both metrics 612 and 614 are within the respective threshold values described above. The vehicle state tracker 506 may determine the vehicle is climbing when the speed metric 612 is greater than or equal to the taxi speed threshold and the altitude metric 614 is greater than the altitude threshold. The vehicle state tracker 506 may determine the vehicle is descending when the speed metric 612 is greater than or equal to the taxi speed threshold and the altitude metric 614 is less than the negative of the altitude threshold (e.g., −10 feet). The vehicle state tracker 506 may determine the vehicle 102 is turning when the speed metric 612 is greater than or equal to the taxi speed threshold; the altitude metric 614 is less than or equal to the altitude threshold; and the roll metric 616 is greater than a roll threshold, for example, 0.5 (or some other threshold value as desired).

The vehicle state tracker 506 may determine the vehicle 102 is straight and level when the speed metric 612 is greater than or equal to the taxi speed threshold; the altitude metric 614 is less than or equal to the altitude threshold; and the roll metric 616 is less than or equal to the roll threshold, for example, 0.5 (or some other threshold value as desired). In some embodiments, the straight and level state may comprise additional criteria. For example, the vehicle state tracker 506 may determine the vehicle 102 is straight and level when, in addition to the above, the distance and/or time to the destination is less than an arrival threshold. In addition or alternatively, vehicle state tracker 506 may determine the vehicle 102 is straight and level when the TTG is less than the beam TTG minimum threshold.

The vehicle state 512 is communicated to a decision block 508, which determines whether antenna blockage mitigation is enabled for the determined vehicle state 512. For example, in the illustrative embodiment, antenna blockage mitigation is enabled only when the vehicle is determined to be in a straight and level state. However, other states may be applicable as noted above (e.g., taxing, stationary, etc.), but with decreased benefits and practicality. Returning to the illustrative example, if decision block 508 determines that antenna blockage mitigation is enabled, an indication of such is communicated to the blockage prediction engine 334. Otherwise, the beam may be designated as not having an antenna blockage event and communicated as message 514. In some embodiments, message 514 may simply be that the beam is unaltered in the beam list, thereby leaving the beam as available for handover operations. While, in other embodiments, message 514 may include tagging the beam as future blockage status null, such that the decision logic module 318 does not filter the beam out of the selection.

Along another pathway of sequence 500, the flight data aggregator 526 receives flight data 350 and extracts and aggregates latitude and longitude coordinates in a manner similar to that described above. The aggregated data is output as aggregated flight data input 528 and provided to the blockage prediction engine 334. In some embodiments, flight data aggregator 526 may aggregate the flight data at a set interval, for example, every 3 minutes or at any desired time interval.

The blockage prediction engine 334 receives flight data 350 along with blockage elevation threshold 522 and blockage azimuth threshold 518 from the antenna blockage threshold database 312. The thresholds 522 and 518 may be included with the flight data 350 or as a separate communication received concurrently, subsequently or previously. The blockage elevation threshold 522 and blockage azimuth threshold 518 may be provided as angle (e.g., degrees) based on the location of the antenna system 118 relative to the object causing the antenna blockage event (e.g., the tail or other object). Additionally, the blockage prediction engine 334 receives a tracking time window 524 defining the forward looking time window to be analyzed for antenna blockage events. That is, the blockage prediction engine 334 is configured to determine whether the antenna system 118 will encounter an antenna blockage event within the received tracking time window. In various embodiments, the tracking time window may be set to 15 minutes. However, other thresholds may be set as desired, for example, a longer time window that provides for forward looking predictions but may require additional computing resources and be less reliable further out or a shorter window that requires less computing resources.

Based on the received data inputs, the blockage prediction engine 334 analyzes the flight data and extrapolates the flight data forward to predict future positions (e.g., waypoints and orientations) and whether an antenna blockage event is likely to occur for each beam of a beam list for each future position within the tracking time window. If so, then the beam is designated with a future blockage status 516. For example, the analyzed beam may be designated or tagged as having antenna blockage event, such that the decision logic module 318 can filter out the designated beams based on the filter logic module 320.

Figure 7:
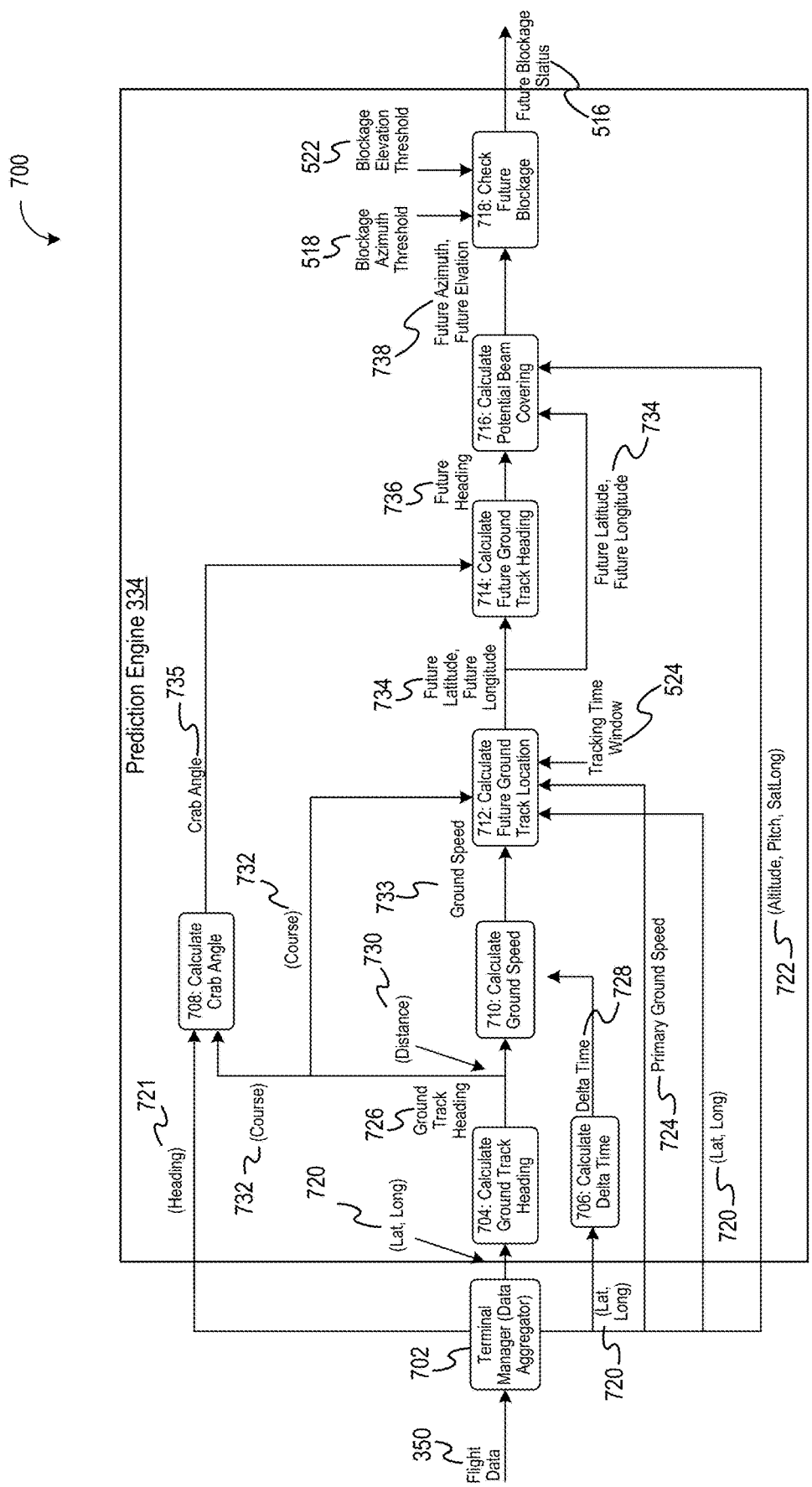
FIG. 7 illustrates an example block diagram of a blockage prediction engine processing sequence.

FIG. 7 illustrates an example block diagram of a blockage prediction engine processing sequence 700. The sequence 700 may be performed, for example, by the blockage prediction engine 334 of the blockage analyzer module 322. The various pathways of the sequence 700 may be executed in tandem, parallel, or in any given sequence.

The blockage prediction engine 334 receives flight data and threshold data as described above. For example, the inputs into the blockage prediction engine 334 may include, but are not limited to, heading data vis the VMS server 328; latitude data from the DMM 332 and/or the VMS server 328; longitude data from the DMM 332 and/or the VMS server 328; altitude data from the VMS server 328; pitch data from the FCC log records of the FCC log event data 350a; ground speed data from the DMM 332 and/or the VMS server 328; longitude coordinates of orbital slots from the map server 305; tracking time window; blockage azimuth threshold; and blockage elevation threshold.

If decision block 508 returns a YES, the flight data 350 is provided a flight data aggregator 702, which may be similar to flight data aggregators 504 and/or 526. The flight data aggregator 702 may extract a defined set of temporally sequential geographic coordinate data entries (e.g., latitude and longitude coordinates) and aggregate the coordinate data entries to generate a single aggregated entry output as aggregated latitude and longitude data 720. The aggregated latitude and longitude data 720 is used to calculate a ground track heading data 726 at block 704, where ground track refers to a line connecting the consecutive positions of the vehicle on the ground. The current ground track heading may be calculated using a set of temporally sequential entries, for example, the most recent three minute of sequential geographic coordinates. Ground track heading provides courses and distances between navigational waypoints of the vehicle 102, and returns azimuths (e.g., course) and distances between the waypoints, which are defined by vectors latitude and longitude.

At block 706 a delta time 728 is determined based on flight data 350. For example, in the illustrative example of FIG. 7, the delta time may be calculated as the amount of time between temporally sequential data entries (e.g., time between a first received geographic coordinate data entry and a subsequent data entry).

At block 710, a current ground speed 733 is calculated based on a distance 730 received from the ground track heading calculation 704 and the delta time 728 received from a delta time calculation at block 706. The current ground speed may be determined using a set of temporally sequential entries, for example, the most recent three minute of distance calculations. In the provided example, the ground speed is converted into degrees per minute and is provided to block 712.

In parallel, prior to, or following, at block 708, a crab angle data 735 is calculated based on heading data 721 extracted from the flight data 350 and course data 732 from the ground track heading data 726. Crab angle is an amount of correction a vehicle must be turned into the wind in order to maintain a desired route. In the illustrative example, the crab angle data 735 may be calculated by subtracting the heading data 721 from the course data 732, where the heading data is the current heading.

At block 712, a future ground track location for the tracking time window is calculated based on current geographic coordinate data 720, current course data 732, and current ground speed data 733. The future ground track location predicts a future N minutes (e.g., the tracking time window) of ground track (e.g., future latitude coordinates and future longitude coordinates) using dead reckoning starting with current latitude, current Longitude, current course, and current ground speed. In navigation, dead reckoning is the process of calculating a current position by using a previously determined position, or fix, and advancing that position based upon known or estimated speeds over elapsed time and course. In various embodiments, the tracking time window or N may be set as desired, for example, 15 minutes. Block 712 outputs the future ground track location for N minutes as a plurality of future latitude coordinates and future longitude coordinates data 734 (e.g., a plurality of future waypoints).

At block 714, future ground track heading data 736 is calculated based on the future latitude coordinates and future longitude coordinates data 734. Future ground track heading data 736 may comprise a future ground track heading (e.g., future course and future distance) for each future latitude coordinate and future longitude coordinate in a manner similar to block 704. The future heading data 736 may be determined by subtracting the crab angle data 735 from the future ground track heading data 736. The future ground track heading data 736 may be indicative of predicted orientations (the pitch and roll being zero in view of straight and level state) of the vehicle 102 at the plurality of future waypoints.

At block 716, potential beam coverage for future positions of the antenna system 118 is calculated. That is, for each future waypoint, potential beams covering the waypoint for establishing communications with a satellite system are determined. The potential beam coverage calculation at block 716 determines a plurality of potential beams for each future latitude and longitude coordinate data 734, each beam corresponding to potential satellite system, and outputs predictions of future azimuth angles and future elevation angles data 738 for steering the antenna system 118 to each potential covering beam at each of the plurality of positions (e.g., future waypoints and orientations).

The potential beam coverage may be calculated based on the future latitude coordinates and future longitude coordinates data 734, future heading data 736, current altitude and pitch data 722 from the flight data 350, and satellite coordinate data from the map server 305. Block 716 calculates future azimuth angles and future elevation angles data 738 for the antenna system 118 using the estimates for future latitude coordinates, future longitude coordinates, and future heading of vehicle 102 along with the current altitude value of vehicle 102, current pitch value of vehicle 102 (roll is set to zero, since vehicle 102 is flying straight and level), and longitude of orbital slot data of satellite systems corresponding to potential covering beams. Satellite systems are positioned in orbital slots allocated under international treaty by the ITU, commonly with a separation between slots of 2° or 3° of orbital longitude in. Using the available beam list, the potential coverage regions (and beams corresponding thereto) through which the antenna system 118 is predicted to pass through may be identified, and, using the longitude of satellite orbital slot for satellite systems corresponding to the beams included in the beam list, provides geographic coordinate information for each potential satellite system. From this, the future azimuth angles and elevation angles data 738, for each potential beam, can be calculated for each of a plurality of future positions of the antenna system 118 along the future ground track location (e.g., future latitude and longitude coordinates data 734) where the vehicle 102 has a future heading data 736 at the plurality of waypoints.

At block 718, future blockage status may be determined for each potential covering beam identified at block 716. For example, for each potential covering beam, block 718 determines whether or not the future latitude and future longitude coordinates data 734 and future heading data 736 is may result in an antenna blockage event. The determination at block 716 uses the future azimuth angles and elevation angles data 738 for each potential covering beam to determine whether the antenna system 118 will need to be steered such that antenna blockage occurs. Determination of an antenna blockage event is based on a comparison of the future elevation angle data 738 against the blockage elevation threshold 522 and a comparison of the future azimuth angle data 738 against the blockage azimuth threshold 518. Based on the comparison, the potential covering beam at the future geographic coordinates data 734 and future heading data 736 is tagged as having an antenna blockage event. As an illustrative example, the covering beam is tagged if the absolute value of the future azimuth angle data 738 is greater than the blockage azimuth threshold 518 and the future elevation angle data 738 is less than the blockage elevation threshold 522. Example default values for azimuth threshold and elevation threshold may be approximately 175° and 28°, respectively. However, these values may be fully adjust on a per terminal basis and used as the comparable thresholds.

Block 716 also computes an amount of time until each predicted antenna blockage event within the tracking time window. That is using the ground speed data 733 and the future geographic coordinates 734, an amount of time until the vehicle 102 will reach each waypoint can be determined and that amount of time associated with the predicted antenna blockage event at that waypoint (if any). Block 716 may also compute the duration of each antenna blockage event that is predicted to occur within the tracking time window.

FIGS. 8A and 8B illustrate an example method flow for performed by connectivity decision system 300 of FIG. 3, in accordance with various aspects of the present disclosure. FIGS. 8A and 8B provide process 800 for performing a handover operation and beam switch of the antenna system. Processes 800 may be performed by one or more of the components of the connectivity decision system 300, for example by the decision logic module 318 and blockage analyzer module 322. Additionally, the processes need not occur in the sequential order illustrated and/or described below, but may occur in any desired order, unless indicated otherwise. Furthermore, one or more of the various process blocks may be executed in parallel with one or more of the other process blocks.

Turning to FIG. 8A, the process 800 transitions to a beam check state at block 803. For example, a current beam used for communication services is monitored for handover scenarios, such as the vehicle exiting a current coverage region and/or interruption or poor signal quality of the beam. As described above, in some implementations, a handover operation may be initiated in response to predicting an antenna blockage event for the current beam. The antenna blockage event may be predicted, as described herein, by calculating future positions and predicting whether a current satellite system will experience antenna blockage at the future positions.

At decision block 804, the process 800 determines whether the time-to-go on the current beam is valid. As used herein, valid TTG may refer to having the information necessary for calculating TTG (e.g., current latitude and longitude, destination latitude and longitude, and airspeed of the vehicle). If YES, the coverage time on the current satellite system is retrieved at block 806 and the current latitude and longitude coordinates; latitude and longitude coordinates of the destination; and current ground speed are provided to the map server 305. At block 806, to be able to calculate TTG a minimal speed value of 10 knots may be needed, otherwise an TTG cannot be calculated (e.g., not valid at step 806), and the coverage time is forwarded to block 814. As another example, step 806 returns a "No" (e.g., not valid) if any of the other information is not available. Otherwise, if decision block 804 returns NO, the process proceeds to block 810.

At block 810, beams available for handover are retrieved, for example, as a beam list. For example, the decision logic module 318 may provide current latitude and longitude coordinates to a map server 305, which retrieves any potential satellite systems based on the current coordinates and provides the potential satellite systems to the beam management module 314. The beam management module 314 generates a beam list of all available beams and provides the list to the decision logic module 318. At block 814, beams having poor signal quality (e.g., RSSI measurement by the antenna system) are filtered out of the beam list. For example, if the RSSI measurement of a given beam is below a quality threshold, the beam is removed from the beam list by the decision logic module 318 and updated at the beam management module 314. At block 816, the remaining beams are filtered based a modem beam list. For example, a modem installed on a vehicle 102 may correspond to a modem beam list (e.g., include in the modem data 338) indicative of beam parameters meeting operating parameters of the modem (e.g., those beams that the modem is configured to receive and utilize for communications), thus at block 816 the beams that the modem is not enabled for are filtered out of the beam list.

At decision block 820, the process 800 determines whether TTG filtering is enabled in the configuration settings of the connectivity decision system 300 (e.g., preset by the operator). If not enabled, the process proceeds directly to block 824. If TTG filtering is enabled, the available beam list is filtered at block 822 by removing beams corresponding to a time-to-go that is less than the TTG threshold. For example, it may be preferable to remove beams from the beam list that have a TTG of less than 5 minutes, because switching over one of these beams will result in another handover within an undesirable amount of time. It may be preferable to identify beams that offer more prolonged communication services.

At block 824, the process 800 further filters the available beam list by removing beams having a hysteresis below a beam quality For example, the filter logic 320 can run multiple filter algorithms to determine if the beam can be remove from the final decision logic 318 (e.g., the various filtering blocks of process 800). At block 824, the beams are filtered out because they don't meet hysteresis requirements for desired beam quality. For each beam left in the beam list following block 820, the actual or current hysteresis value of a beam is compared with the hysteresis requirement, and, if it is below the hysteresis requirement, the beam is removed from the beam list.

As shown in FIG. 8B, at decision block 826 the process 800 determines whether the antenna blockage mitigation is enabled. For example, decision block 826 may include performing the vehicle state processing sequence 600 to determine the state of the vehicle and the antenna blockage mitigation process is enabled for the determined state. In various embodiments, decision block 826 returns YES only when the vehicle state is straight and level. Alternatively, in some embodiments, the decision block 826 may return YES when the vehicle state is one of straight and level, taxing, stationary, destination within an arrival threshold, and the TTG is within a beam TTG minimum threshold. If decision block 826 returns YES, then at block 828 the decision engine 302 performs blockage prediction analysis, for example, as set forth above in connection to FIGS. 4-7. The results of block 828 are used at block 830 to filter out beams tagged as having antenna blockage events. For example, the blockage analyzer module 322 performs blocks 826 and 828 and provides the results to the decision logic module 318, which uses the results to perform block 830.

As another example, in some embodiments, decision block 826 may comprise checking that blockage detection is enabled in the configuration of the connectivity decision system 300. In this case, the vehicle state is determined as part of block 828 and the process 800 proceeds as detailed above.

At block 838, either after filtering in block 830 or if decision block 826 returns NO, the beam list is analyzed to determine if there are no beams available (e.g., zero available beams). If yes, the process 800 proceeds to termination 824 and the system returns to monitoring state (e.g., returns to the block 803 to monitor for available beams to reestablish communications). If block 832 returns NO, then the process 800 proceeds to decision block 838 and determines whether there are multiple available beams in the beam list. If YES, then the process proceeds to block 840 to select one of the multiple beams for switching communication over to. If NO, the process determines whether the remaining beam available in the beam list has a signal strength that is equal to or less than the current beam at block 842. If YES, the decision engine 302 remains with the current beam and returns to a monitoring state (e.g., block 803); otherwise, the decision engine 302 transmits a set beam event to the vehicle 102 at block 844 to initiate a transfer to beam switch state at block 848 and ends process 800.

In another example, the decision engine 302 may be configured to detect intersecting coverage regions and minimize a number of handovers while the vehicle crosses intersecting coverage regions between multiple satellite systems. The decision engine 302 may be configured to utilize the future predictions described in connection with FIG. 7 to minimize the number of handovers, thus improving prediction of beam switching from one to another.

Figure 9A:
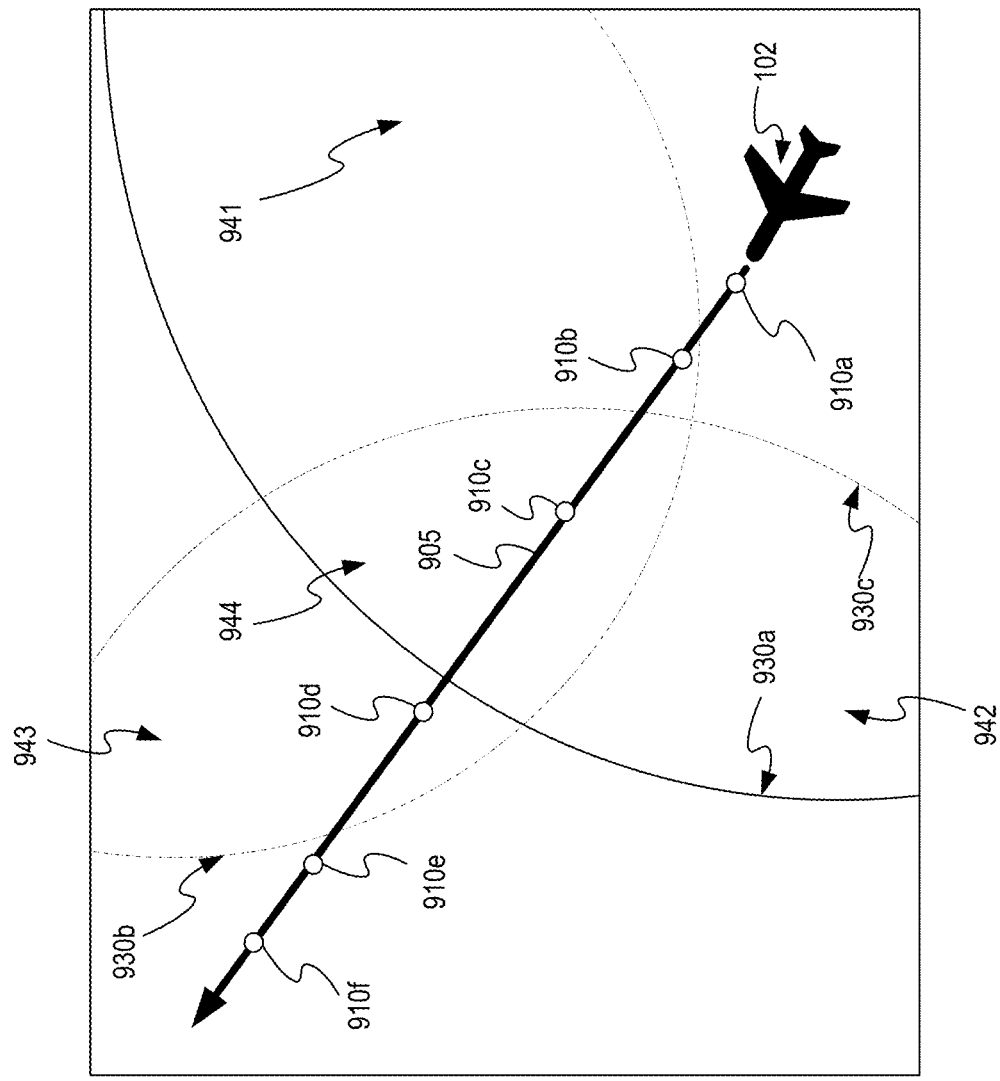
FIGS. 9A and 9B illustrate example schematic diagrams of minimizing a number of handovers.
Figure 9B:
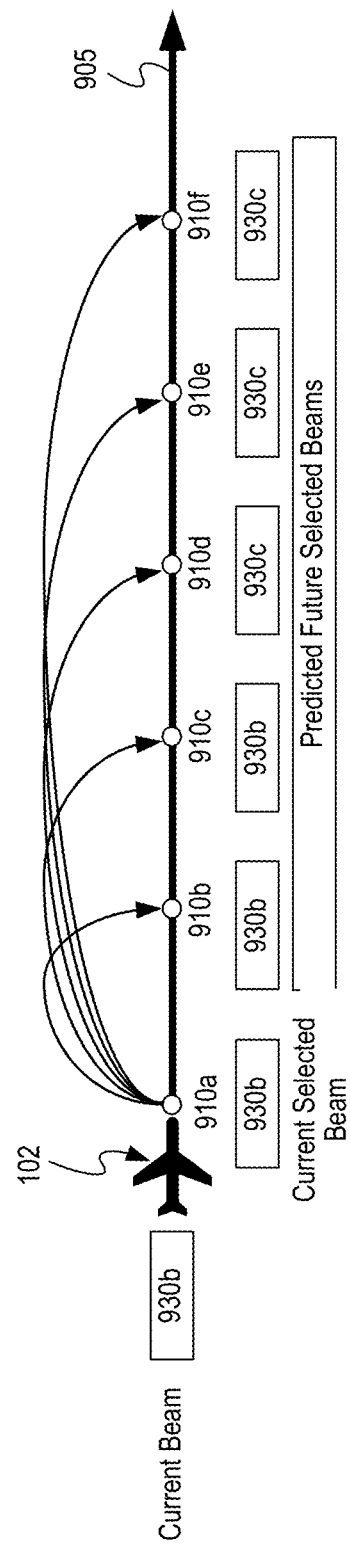

For example, FIGS. 9A and 9B illustrate schematic diagrams of minimizing a number of handovers, in accordance with various aspects of the present disclosure. FIG. 9A depicts a flight plan 905 for vehicle 102 crossing a plurality of intersection regions 941-944 of coverage regions 930a, 930b, and 930c for separate satellite systems (not shown). For example, coverage regions 930a and 930b form an intersection region 941; coverage regions 930a and 930c form an intersection region 942; coverage regions 930b and 930c form an intersection region 943; and coverage regions 930a-c form an intersection region 944.

The illustrative example of FIG. 9A depicts flight plan 905 traveling from coverage region 930a through each intersection region before entering coverage region 930c. That is, at waypoint 910a the vehicle 102 is in coverage region 930a and then travels to waypoint 910b where it is in intersection region 941. While in intersection region 941, the vehicle 102 may be capable of utilizing either coverage region 930a or 930b for communication services. Then, at waypoint 910c, the vehicle 102 is in intersection region 944, whereby the vehicle is in coverage regions 930a-c and thus able to utilize any coverage region 930a-c. Next, at waypoint 910d, the vehicle 102 has exited coverage region 930a, is in intersection region 943, and is capable of communications via coverage region 930b or 930c. Finally, at waypoint 910e, the vehicle exits coverage region 930b and is capable of communications via only coverage region 930c.

In conventional systems, at waypoint 910b, the vehicle is only able to see beams from satellite systems corresponding to coverage regions 930a and 930b, and does not see beams for coverage region 930c. As such, conventional systems determine to switch communications to the satellite system for coverage region 930b. Similarly, at waypoint 910d, the conventional systems realizes that it is exiting coverage region 930b, requiring another handover to the satellite system for coverage region 930c, and performs another switch over to 930c having been in coverage region 930b only briefly. Had the vehicle detected the intersection region 944, realizing that the vehicle would only be in coverage region 930b briefly and that coverage region 930c would be available before exiting coverage region 930a, the switch to the satellite of coverage region 930b could have been avoided. Thereby, minimizing the number of handovers and possible service interruptions.

Accordingly, embodiments herein may be configured to utilize the blockage prediction engine 334 to determine a plurality of future positions and future covering beams (e.g., corresponding to future coverage regions), and, based on these results, predict whether the flight plan will cross an intersection. If an intersection is predicted, a current handover decision (e.g., a currently selected beam to effectuate a handover) can be delayed until the vehicle 102 crosses the intersection point (e.g., clears the intersection regions and can make a reliable, prolonged beam switch). In some embodiments, the decision engine 302 may use the current position (as described above in connection to FIG. 7) to predict future positions and future covering beams. Based on the results, the decision engine 302 is configured to predict whether an intersection will occur within an intersection time window (e.g., 5 minutes or any time threshold desired, configurable within the decision engine 302), for example, by predicting future handovers at the future positions. The decision engine 302 may perform the analysis at a configurable number of iterations (e.g., 1 minute time intervals defining the number iterations or any desired number of iterations based on a time interval there between), so as to track the future position and predict future intersections in real time. If a future handover involves a beam that is different than the beam selected for the current handover, then the decision engine 302 will wait until reaching the intersection to switch beams.

In some embodiments, the decision engine 302 may compare a plurality of future selected beams corresponding to predicted handover operations against the currently selected beam. For example, as shown in FIG. 9B, the decision engine 302 may identify 5 future selected beams based on the intersection time window and configurable time interval (e.g., 5 minute intersection time window with 1 minute intervals). As an illustrative example, the first future selected beam may be the same as the current beam, but the second future selected beam is different. In this case, the decision engine 302 would wait until the reaching the second future selected beam. In some embodiments, if a subsequent future selected beam of the plurality of future selected beams is different from the current selected beam and/or a preceding future selected beam, then the decision engine 302 will wait until reaching the subsequent future selected beam. In some embodiments, alone or in combination, the decision engine 302 may wait until a latter subset of the plurality of future selected beams are the same, then the decision engine 302 may wait until the first future selected beam of the latter subset of future selected beams to handover communications.

Figure 10:
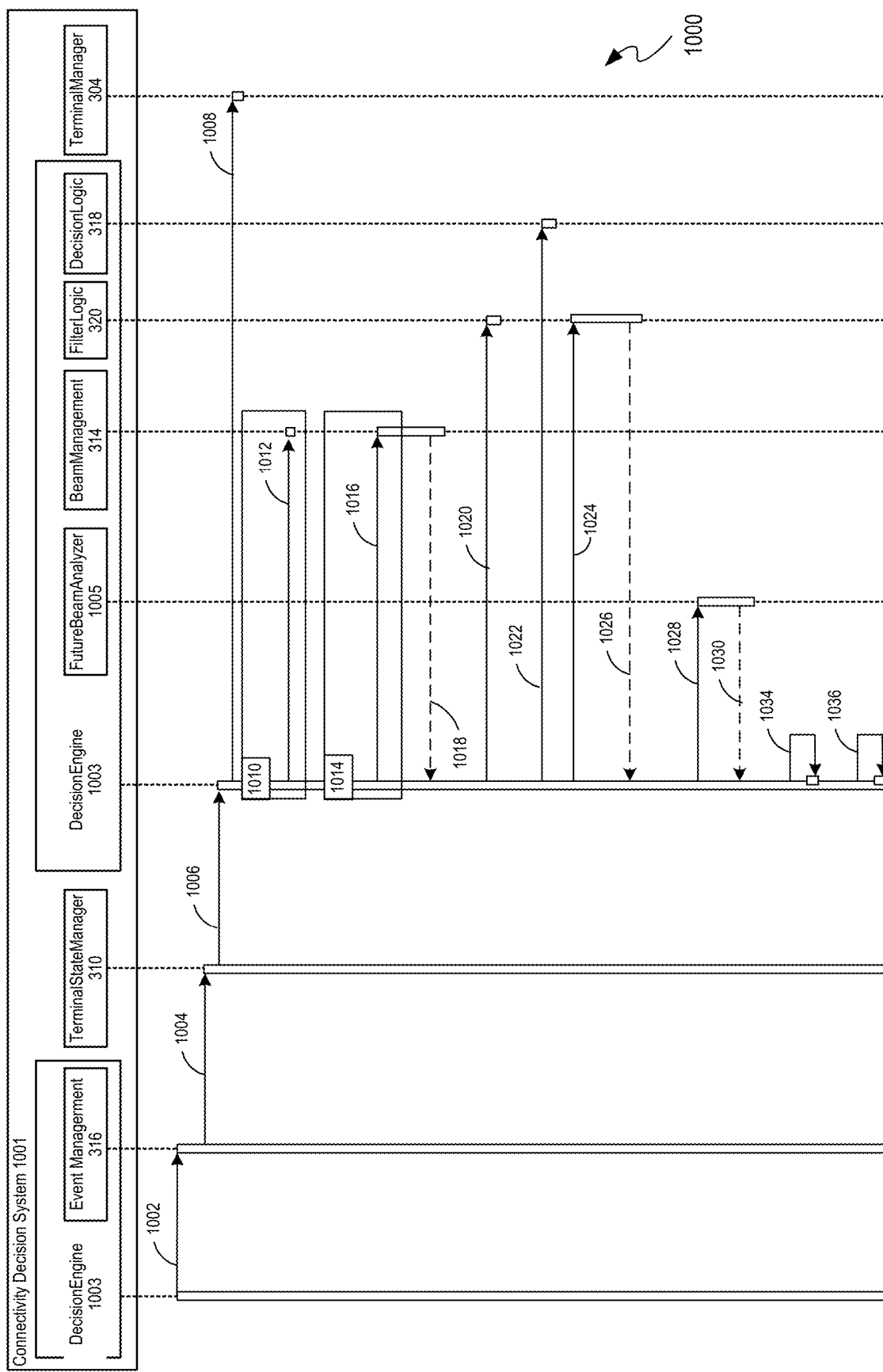
FIG. 10 illustrates an example intersection detection processing sequence performed by a connectivity decision system.

FIG. 10 illustrates an example intersection detection processing sequence 1000 performed by a connectivity decision system 1001, in accordance with various aspects of the present disclosure. FIG. 10 depicts the connectivity decision system 1001, which is substantially similar to the connectivity decision system 300, except as provided herein. The connectivity decision system 1001 comprises a decision engine 1003 that is substantially similar to and configured to operate in a similar manner to the decision engine 302, except as provided herein. As with decision engine 302, the decision engine 1003 comprises event management module 316, terminal state manager 310, beam management module 314, filter logic module 320, decision strategies 326, decision logic module 318, and terminal manager module 304.

The decision engine 1003 also includes future beam analyzer module 1005 that is similar to the blockage analyzer module 322, except as provided herein. For example, the future beam analyzer module 1005 can be configured to use current position data (e.g., current heading, current geographic coordinates, crab angle, etc.) to predict a plurality of future positions (e.g., future heading and future geographic coordinates of waypoints) and future covering beams as described above in connection to FIG. 7. The future beam analyzer module 1005 is configured to use the future predictions to detect an intersection crossing by the vehicle 102 through sequence 1000. In various embodiments, the future beam analyzer module 1005 may be included as part of or in tandem with the blockage analyzer module 322.

Sequence 1000 initiates at the decision engine 1003, which sends command 1002 to the event management module 316. Command 1002 may initiate a handover operation, for example, where vehicle 102 is at waypoint 910a of FIGS. 9A and 9B and determined to switch off of beams corresponding to coverage region 930a. Command 1002 identifies a vehicle for which the sequence is carried performed, for example, by including the unique vehicle ID to identify vehicle 102 (from a fleet of vehicles) and an instruction for a status update. The event management module 316 retrieves flight data of an event (e.g., an FCC log event) and forwards the flight data to the terminal state manager module 310 via command 1004.

The terminal state manager module 310 determines the state of the vehicle 102 as described above in connection to FIGS. 4-6. In various embodiments, if the state of vehicle 102 is one for which intersection detection is enabled, the terminal state manager module 310 sends command 1006 to the decision engine 1003 indicating such. If the state of the vehicle 102 is not one for which intersection detection is enabled, the sequence ends and returns to command 1002. In various embodiments, intersection detection is enabled for a straight and level state; however, other states are possible as described above in connection to the antenna blockage mitigation processes. Command 1006 may also include the unique vehicle ID and a configurable time interval. The configurable time interval may be preset by the operator.

The decision engine 1003 may retrieve additional flight data from the terminal manager via request 1008. The flight data from request 1008 may be, for example, flight data 352 as described above in connection to FIG. 4. For example, the decision engine 1002 is requesting the current terminal object which is a pointer to the terminal (e.g., terminal 115) being evaluated. In some embodiments, the decision engine 1003 sends request 1008 to the terminal state manger module 310 (not shown), because the terminal manager module 304 feeds events to event management module 316 and the terminal state manager module 310 uses this feed data for responding to request 1008. Using the flight data 352, the decision performs iterative process 1010 for each interval based configured interval, which comprises monitoring the current speed to determine whether a handover is needed. For example, iterative process 1010 determines whether the current ground speed is greater than a calculated minimum speed based on the TTG for the current coverage region. In some implementations, iterative process 1010 includes comparing flight data 352 to see if TTG is valid and determines a minimum speed, such as 10 knots in this example (however other speeds are applicable based on desired design constraints). If the current ground speed is greater than the calculated minimum speed based on the TTG, the decision engine 302 sends request 1012 to beam management module 314 including a "Get" command to retrieve a beam list of available beams and associated TTG parameters for each beam of the beam list. For example, in response to request 1012, a list of beams is generated that includes TTG calculation for each beam at the beam management module 314. Similarly, iterative process 1014 is performed which is the same as iterative process 1010 (e.g., determines whether the current ground speed is greater than a calculated minimum speed based on the TTG for the current coverage region). If the current ground speed is greater than the calculated minimum speed based on the TTG at iterative process 1014, the decision engine 302 sends request 1016 to beam management module 314 including a "Get" command to retrieve a beam list of available beams and beam qualities parameters associated with each beam of the beam list. In response to request 1016, a list of beams is generated that doesn't include a TTG calculation for each beam and, instead, includes a beam quality of each beam. Each request 1012 and 1016 includes the unique vehicle ID and the latitude and longitude coordinates of the vehicle 102.

In response to requests 1012 and 1016, the beam management module 314 sends response 1018 including the beam lists and requested parameters. The decision engine 302 then filters the beam lists using the filter logic module 320 via command 1020, for example, as described above in connection to FIGS. 8A and 8B. For example, the filter logic module 320 applies filters to filter out beams having zero quality (e.g., qualities below a threshold) and based on hysteresis. In various embodiments, the filter logic module 320 may also filter out beams tagged as having an antenna blockage event as described herein.

At command 1022, the decision engine 302 applies the decision logic module 318 to select a current beam for completing the handover. For example, the selected beam at command 1024 may correspond to coverage region 930b as described above in connection to FIGS. 9A and 9B, where the vehicle 102 is exiting coverage region 930a and is deciding to switch a satellite system for communication services. The decision engine 302 requests the information for the selected beam at 1024 and receives the information via response 1026 from the filter logic module 320. In some implementations, the command 1022 creates a new instance of executing the decision engine 1003 but does not run the decision selection until the decision logic module 318 is executed, for example, at 1024, to select a new beam or remain on the current beam.

The decision engine 1003 then requests predicted future beams from the future beam analyzer module 1005 at command 1028. The future beam analyzer module 1005 determines a plurality of predicted covering beams based on predicted future positions of the vehicle 102. The plurality of predicted covering beams are provided to the decision engine 302 via response 1030 and, at process 1032, each predicted covering beam is compared against the current selected beam from response 1026. If the predicted covering beam is different than the current selected beam, then the decision engine 302 determines to skip the beam switch as process 1034.

Figure 11:
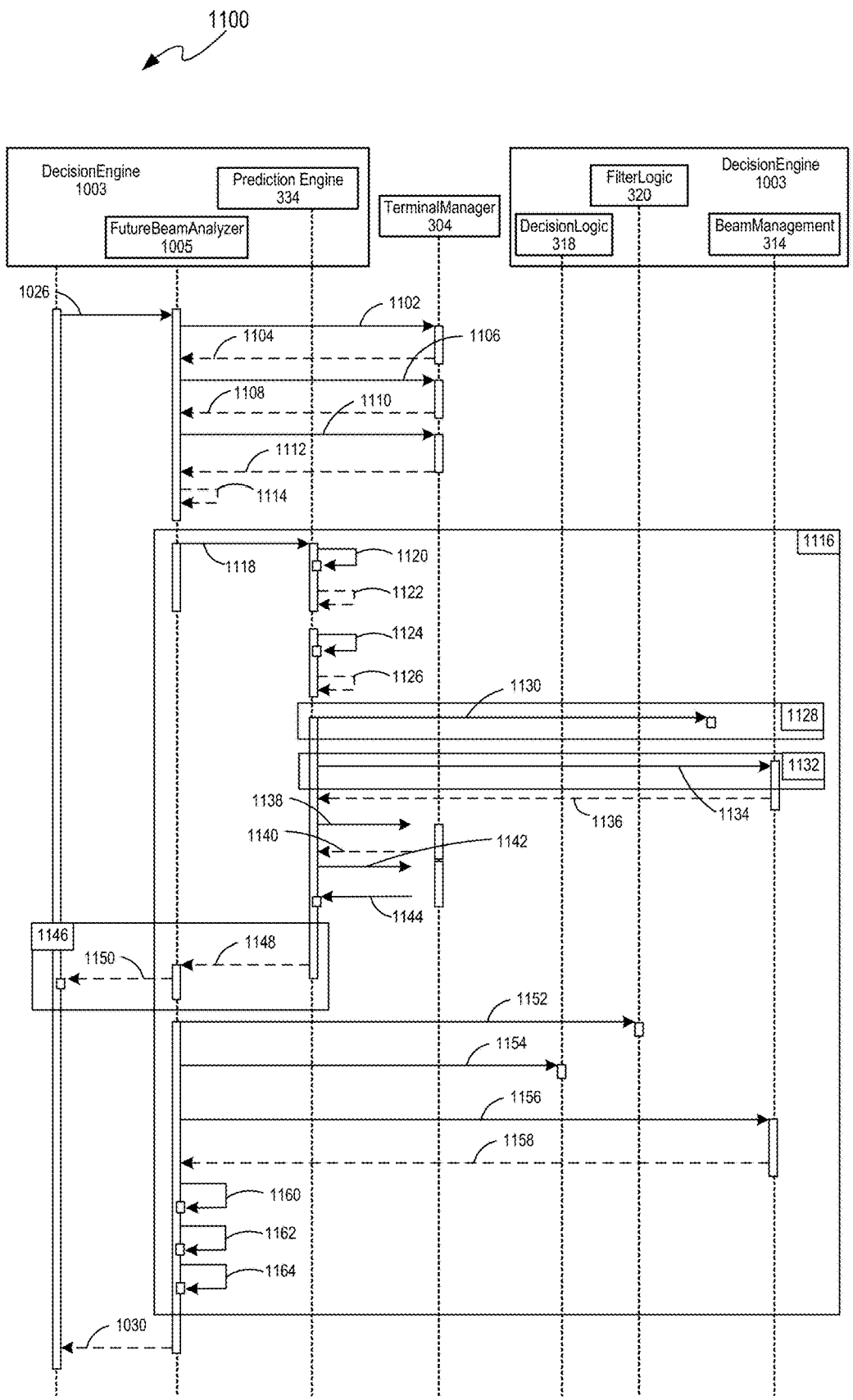
FIG. 11 illustrates an example processing sequence for predicting future covering beams.

FIG. 11 illustrates an example processing sequence 1100 for predicting future covering beams, in accordance with various aspects of the present disclosure. Processing sequence 1100 may be performed as part of processing sequence 1000, for example, in response to command 1028.

Upon receipt of command 1028 from the decision engine 302 requesting predicted future beams, the future beam analyzer module 1005 requests the position information by issuing commands 1102 and 1106, which may be "GetPosition" commands. In response to the command 1102, the terminal manager 304 provides flight data 352 to the future beam analyzer module 1005. For example, the terminal manager 304 provides a previous position (e.g., previous geographic coordinates and orientation) in response 1104 and a current position (e.g., current geographic coordinates and orientation) in response 1108. The future beam analyzer module 1005 also requests the average ground speed with command 1110, to which the terminal responses with response 1112 including the average ground speed. The future beam analyzer module 1005 convers the average ground speed into degrees per minute at process 1114.

At iterative process 1116, the future beam analyzer module 1005 repeats a beam prediction sequence a number of times based on the configurable interval. At command 1118, the future beam analyzer module 1005 requests future covering beams. Command 1118 may be a "Get" command including a unique vehicle ID, the previous and current positions, and the average ground speed in degrees per minute. These values by be used to determine future positions and identify future covering beams, as described above in connection to the blockage prediction engine 334. For example, the command 1118 is received by the blockage prediction engine 334, which determines ground track heading using the current and previous positions and returns the ground track heading at process 1120. At process 11202 the course of the ground track heading is used to determine an azimuth angle of the current heading. These values are used at process 1124 to determine future positions, for example, by using the current and previous positions, with the course and average ground speed to predict a future position within a tracking time window at process 1126.

The blockage prediction engine 334 then performs iterative process 1128 for each interval based configured interval. Iterative process 1128 is similar to iterative process 1010, in which the process 1128 determines whether the current ground speed is greater than a calculated minimum speed based on the TTG for the current coverage region. In some implementations, iterative process 1128 includes comparing flight data 352 to see if TTG is valid and determines a minimum speed, such as 10 knots in this example (however other speeds are applicable based on desired design constraints). If the current ground speed is greater than the calculated minimum speed based on the TTG, the blockage prediction engine 334 sends request 1130 to beam management module 314 including a "Get" command to retrieve a beam list of available beams and associated TTG parameters for each beam of the beam list. For example, in response to request 1130, a list of beams is generated that includes TTG calculation for each beam at the beam management module 314. Similarly, iterative process 1132 is performed which is the same as iterative process 1128 (e.g., determines whether the current ground speed is greater than a calculated minimum speed based on the TTG for the current coverage region). If the current ground speed is greater than the calculated minimum speed based on the TTG at iterative process 1132, the blockage prediction engine 334 sends request 1134 to beam management module 314 including a "Get" command to retrieve a beam list of available beams and beam qualities parameters associated with each beam of the beam list. In response to request 1134, a list of beams is generated that doesn't include a TTG calculation for each beam and, instead, includes a beam quality of each beam. Each request 1130 and 1134 includes the unique vehicle ID and the future latitude and longitude coordinates of the vehicle 102.

In response to requests 1130 and 1134, the beam management module 314 sends response 1136 including the beam lists and requested parameters of the predicted covering beams. The blockage prediction engine 334 then issues command 1138 to request the receiver information related to antenna system 118 from the terminal manager 304, which is supplied as response 1140. For example, information about the active receiver of the antenna system 118 is supplied at 1140. This may be necessary because a terminal 115 can have multiple receivers and a beam switch decision can be handled by one or two receivers, and the active receiver information should be utilized to perform the beam switch. The blockage prediction engine 334 requests the current beam used for communications using command 1142, which is returned by the terminal manager 304 in response 1144 as a beam ID for the current beam. At iterative process 1146, the current beam ID is compared against the beam IDs of the predicted covering beams in the received beam list. If a count of the current beam ID in the beam list of the predicted covering beam is below a number (set by the operator), then the blockage prediction engine 334 issues command 1148 indicating an invalid beam ID, which is forwarded to the decision engine 302 via command 1150 from the future beam analyzer module 1005. That is, iterative process 1146 determines whether there is a minimum number of beams in the beam list, and if the number of beams is below a set minimum number of beams (e.g., 2 beams or as desired by the operator) then the current beam is indicated as invalid at command 1148. In this way, the blockage prediction engine 334 can be configured to only consider situations where the number of beams is above a set threshold. Next, the future beam analyzer module 1005 filters the predicted beam lists using the filter logic module 320 via command 1152, for example, as described above in connection to FIGS. 8A and 8B. For example, the filter logic module 320 applies filters to filter out beams having zero quality (e.g., qualities below a threshold) and based on hysteresis. In various embodiments, the filter logic module 320 may also filter out beams tagged as having an antenna blockage event as described herein.

At command 1154, the decision engine 302 applies the decision logic module 318 to select a beam for from the predicted beam list. The decision engine 302 requests the information for the selected beam at 1156 and receives the information via response 1158 from the filter logic module 320. At process 1160, a count for the predicted beam is indexed in the beam list, for example, by adding 1 to a counter for the predicted beam. The previous position used in command 1118 is updated to the position that was previously the current position at process 1162 and the current position is updated to the future position determined at 1126 at process 1164. The iterative process 1116 is then repeated using the updated values a number of iterations based on the set interval.

Once the iterative process 1128 is completed, the predicted beam having the largest count is transmitted to the decision engine as response 1030.

In another example, the decision engine 302 may be configured to select beams based on utilization. For example, at block 840 of FIG. 8B, the decision engine 302 may apply decision logic to select a beam of a plurality of beams for handover of communications, and in some implementations that decision logic may select a beam to achieve optimal load balancing based on beam utilization. Similarly, the decision logic applied at command 1022 to select a beam may utilize load balancing based on beam utilization. Similarly, the predicted covering beams described herein may be filtered and selected aimed to load balance based on utilization. That is, at command 1154, the decision logic may utilize load balancing based on beam utilization.

Some systems performed load balancing based on a count of vehicles using a given beam. For example, these methods would calculate a load balancing by vehicle count value as $$TLBacCount(n, t) = 10 \times \frac{MaxAllowedVperBeam(n) - CurrentBeamVcount(n, t)}{MaxAllowedVperBeam(n) - Min(allAvailableVcount(t))} \qquad \text{Eq. 1}$$

The measurement for each available beam listed in a beam list considered for a handover operation would be used in weighting algorithm. The max weighted score of all beams in the beam list would be selected as the target network. Load balancing based on vehicle count assumes uniform utilization by each vehicle, in which case load balancing may be achieved. However, where usage characteristics per each vehicle are asymmetrical or not uniform (which is generally the case), network utilization may not be properly balanced for optimal usage.

To provide improved balancing of network usage, embodiments herein may evaluate the utilization of each beam in a beam list and selecting a beam for handover (or predicting a future beam) based on balancing the actual utilization of each beam across the network. For example, the decision logic module 318 may calculate a utilization load balance measured as:

$$ULB(n, t) = 10 \times \frac{MaxUtilperBeam(n) - CurrentBeamUtil(n, t)}{MaxUtilperBeam(n) - Min(allAvailableBeamUtil(t))} \qquad \text{Eq. 2}$$

Where MaxUtilperBeam is a maximum utilization per beam (n) on the network. The current beam utilization (e.g., CurrentBeamUtil) is a measurement of the current utilization over time of a given beam. Here, min(allAvailableBeamUtil(t)) returns the value of the measured lowest utilization of all available beams. Equation 2 is applied to each beam of a beam list and a weighting algorithm is applied to each beam. The weighting algorithm may be as follows:

WeightedScore=W1×CurrentBeamFlag+W2× BeamQualityFlag+W3×HysteresisFlag+W4× TTG+W5×ULB.  Eq.3

In the above equation, CurrentBeamFlag is the Active Beam score. The flags can be represented as the decision results of a strategy, in this case the current beam strategy only assigns the value if the beam being evaluated is the current active beam. For example, if the following values are used:
Weight Values
Current beam weight (W1): 5
Beam quality weight (W2): 1
Hysteresis weight (W3): 500
TTG weight (W4): 3
ULB weight (W5): 4
Then there will be two beams with the properties as:
Beam 1: Active Beam=False, Quality is 10, TTG=10, . . . .
Beam 2: Active Beam=True, Quality is 15, TTG=5 . . . .
Here, WeightScore=W1*CurrentBeamFlag+ W2*BeamQualityFlag+W3*HysteresisFlag+W4*TTG+ W5*ULB.

Accordingly, the WeightScore result after running the strategy would be:
Beam 1: WeightScore=W1*0+W2*(10/Max(15))+W3* (0)+W4(10/MAX(10))+ . . . .
Beam 2: WeightScore=W1*1+W2*(15/Max(15))+W3* (0)+W4(5/MAX(10))+ . . . .

The variable BeamQualityFlag is a measure of the beam quality (e.g., RSSI) as provided with the flight data; the HystersisFlag is a measure of the beam hysteresis as provided with the flight data; TTG is a measure of the time remaining on the current beam, as described herein; and the ULB is provided by Eq. 2.

The weight for each flag may be set as desired by the operator. In the above example, W1 is set to 5, W2 is set to 1, W3 is set to 500, W4 is set to 3, and W5 is set to 4. In other embodiments, the weights are just given a value that can control the contribution and overall score. The higher the number the more impact that strategies will have on the final WeightScore. Using this calculation, the decision logic module 318 may select a beam from a beam list that corresponds to the weighted score having the highest value (e.g., the max weighted score).

In some embodiments, the decision logic module 318 may apply load balancing by utilization per beam to both the forward and return beam paths. For example, the forward beam utilization per beam (n) over time may be determined as follows, if the beam being examined is the current beam, then apply:

$$ULB\_FWD(n, t) = 10 \times \frac{MaxFWDUtilperBeam(n) - CurrentBeamFWDUtil(n, t)}{MaxFWDUtilperBeam(n) - Min(allAvailableBeamFWDUtil(t))} \qquad \text{Eq. 4}$$

Otherwise, apply the following:

$$ULB\_FWD(n, t) = 10 \times \frac{MaxFWDUtilperBeam(n) - (CurrentBeamFWDUtil(n, t) + FWD\_CIR\_Per(n))}{MaxFWDUtilperBeam(n) - Min(allAvailableBeamFWDUtil(t))} \qquad \text{Eq. 5}$$

Where MaxFWDUtilperBeam is a maximum forward utilization per beam (n) on the network; the current forward beam utilization (e.g., CurrentBeamFWDUtil) is a measurement of the current forward utilization over time of a given beam; and min(allAvailableBeamFWDUtil(t)) returns the value of the measured lowest forward utilization of all available beams.

The carrier-to-interference ratio (CIR) for each beam can be determined as follows:

$$FWD\_CIR\_Per(n) = \frac{(FWD\_CIR\_mbps \times MbpsToMhz(n))}{TotalMhzFWD(n)} \qquad \text{Eq. 6}$$

Where MbpsToMhz(n) equals 1 divided by EFF_FWD (terminal→(Lat,Lon),n). Here, CIR stands for "Commit Information Rate." This rate is the minimal guaranteed rate the system will give in bandwidth to the terminal (modem). This may be a static value define in the Network. So FWD_CIR_mbps is the guaranteed bandwidth in the forward link in the units of mbps.

TotalMhzFWD is Total Mhz on the Forward Link, this is defined as:

TotalMhzFWD=BeamSymobalRate*(1.0*BeamRoll- OfFator)

Using C++ like syntax, this may be written as:

fwd_total_mhz=static_cast<double>(sat→Symbol- Rate( ))*(1.0+sat→RollOfFactorD( ));

Where
BeamSymbolRate is the SymbolRate of the Beam being evaluated.
BeamRollOfFator is the Roll of Factor of the beam being evaluated. The value is unit of percent normally 5%.

In some embodiments, all these values may come from the Network.

In the above equation, MbpsToMhz is the efficiency in Mbps for the current location. This uses a statically generated efficiency grid file for the forward and return per beam, per antenna type on the specific beam being evaluated. This return the value from the grid.

EFF_FWD (terminal (lat, long), n) is the functional that returns Efficiency in Mbps for the Forward link grid. The EFF_FWD grid is an estimated spectral efficiency grid at each location within a grid overlaying the beam service area. It is computed by estimating the forward link RF performance at each grid location for a given bandwidth and antenna type and then using the modem characteristics to determine the corresponding projected throughput. The spectral efficiency is then the throughput divided by the bandwidth. Please note that the units for spectral efficiency are Mbps/MHz, or equivalently, bps/Hz.

The return beam utilization per beam (n) over time may be determined as follows, if the beam being examined is the current beam, then apply:

$$ULB\_RTN(n, t) = 10 \times \frac{MaxRTNUtilperBeam(n) - CurrentBeamRTNUtil(n, t)}{MaxRTNUtilperBeam(n) - Min(allAvailableBeamRTNUtil(t))} \quad \text{Eq. 7}$$

Otherwise, apply the following:

$$ULB\_RTN(n, t) = 10 \times \frac{MaxRTNUtilperBeam(n) - (CurrentBeamRTNUtil(n, t) + RTN\_CIR\_Per(n))}{MaxRTNUtilperBeam(n) - Min(allAvailableBeamRTNUtil(t))} \quad \text{Eq. 8}$$

where $$RTN\_CIR\_Per(n) = \frac{(RTN\_CIR\_mbps \times MbpsToMhz(n))}{TotalMhzFWD(n)} \quad \text{Eq. 9}$$

Where MbpsToMhz(n) equals 1 divided by EFF_RNT (terminal→(Lat,Lon),n).

The decision engine 302 may composite the forward and the return values by taking the minimum of the ULB_FWD (n,t) and the ULB_RTN(n,t), which will identify the lower score between FWD and RTN for a network. The lower score will be used in the weighting described in Eq. 3, and the decision logic module 318 may select a max weighted score to achieve balanced network usage.

Figure 12:
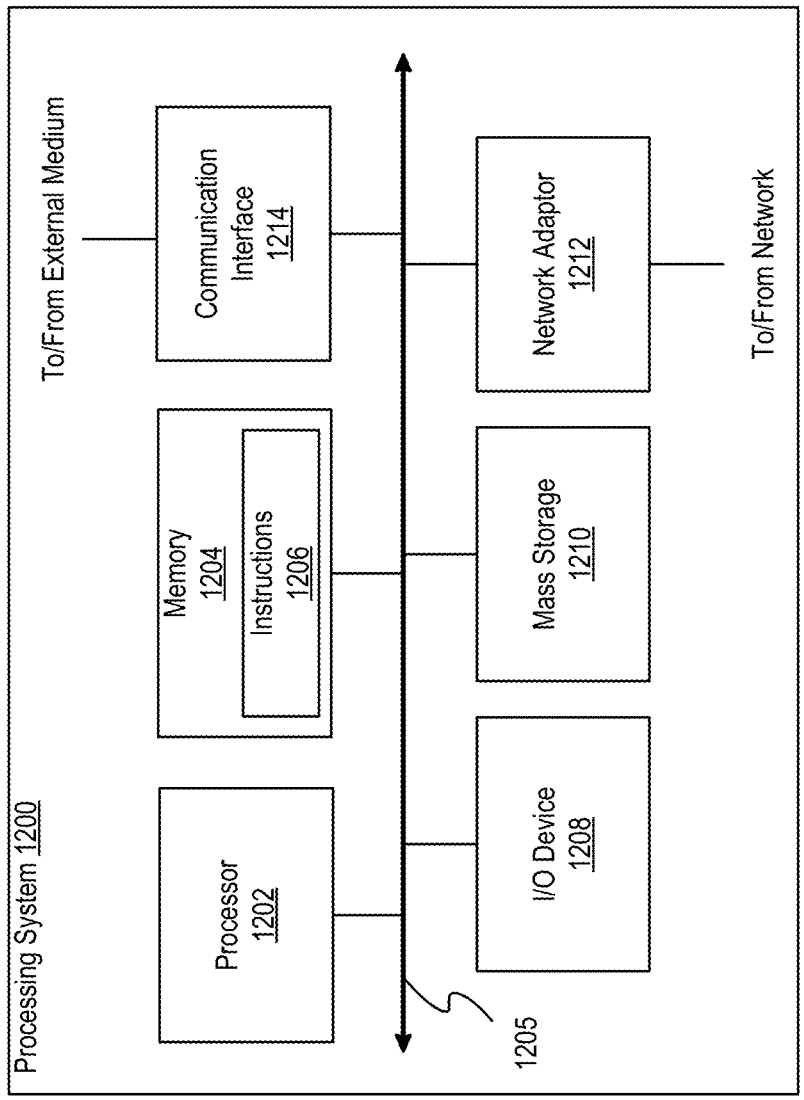
FIG. 12 illustrates a block diagram of a computing system.

FIG. 12 illustrates a block diagram of a computing system, in accordance with various aspects of the present disclosure. FIG. 12 is a high-level block diagram showing an example of the architecture of a processing system 1200 that may be implemented as any one or more of the components of embodiments described herein. The processing system 1200 can represent one or more of components comprised in the airside system 110, one or more of the components comprised in the ground side system 120 or other systems and components of the vehicle communication system 100.

Note that certain standard and well-known components which are not germane to the present aspects are not shown in FIG. 12.

The processing system 1200 includes one or more processor(s) 1205 and memory 1204, coupled to a bus system 1205. The bus system 1205 shown in FIG. 12 may be an abstraction that represents any one or more separate physical buses and/or point-to-point connections, connected by appropriate bridges, adapters and/or controllers. The bus system 1205, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard bus (sometimes referred to as "Firewire") or any other interconnect type. The bus system 1205 may also be representative of one or more of the bus lines described above in connection to FIGS. 3 and 4. For example, the bus system 1205 may include Ethernet lines (100Base-T or faster) and/or fiber optic lines using simple network management protocol (SNMP), MQ Telemetry Transport (MQTT) bus that uses MQTT messaging protocols, and/or proprietary protocol(s) to other types of controllers, such as maintenance controllers.

The processor(s) 1202 are the central processing units (CPUs) of the processing system 1200 and, thus, control its overall operation. In certain aspects, the processors 1202 accomplish this by executing software stored in memory 1204. A processor 1202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. In various embodiments, for example, the decision engine 302 may be implemented as processor(s) 1202.

Memory 1204 represents any form of random access memory (RAM), read-only memory (ROM), flash memory, or the like, or a combination of such devices. Memory 1204 includes the main memory of the processing system 1200. Instructions 1206 may be used to implement the functions and processes described above, for example, in FIGS. 3-11. For example, the memory 1204 may include instructions used to implement the antenna blockage mitigation sequence(s), the intersection and future beam detection sequence, and the load balancing sequence as described herein. The memory 1204 may be coupled to the processor 1202, and the processor 1202 may be configured to execute instructions (e.g., software) stored in the memory 1204 to carry out the various aspects of the universal portal system described herein.

Also connected to the processors 1202 through the bus system 1205 are one or more internal mass storage devices 1210, and a network adapter 1212. Internal mass storage devices 1210 may be, or may include any conventional medium for storing large volumes of data in a non-volatile manner, such as one or more magnetic or optical based disks, flash memory, or solid-state drive.

The network adapter 1212 provides the processing system 1200 with the ability to communicate with devices and or external systems (e.g., over a network) and may be, for example, an Ethernet adapter, USB ports, optical fiber ports, or the like. The network adapter 1212 may be provided as the processing system 1200 with the ability to communicatively couple with the Internet (e.g., Internet 140).

The processing system 1200 also includes one or more input/output (I/O) devices 1208 coupled to the bus system

1205. The I/O devices 1208 may include, for example, a display device, a touch screen device, a microphone for voice commands, a camera for detecting gestures and other non-tactile inputs, a keyboard, a mouse, etc. The I/O device may be in the form of a handset having one or more of the foregoing components, such as a display with a real or virtual keyboard, buttons, and/or other touch-sensitive surfaces.

The processing system 1200 also includes a communication interface 1214. The communication interface 1214 allows software and data to be transferred processing system 1200 and external devices (e.g. airside system 110), networks, or information sources. Examples of communication interface 1214 include a modem, a network interface card ("NIC"), a wireless data card, a communications port, a PCMCIA slot and card, an infrared interface, and an IEEE 1394 fire-wire, just to name a few.

Communication interface 1240 may implement industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well. Communication interface 1240 may be configured to interface with communication connectivity systems 130 as described herein, for example, communication interface 1240 may communication using SATCOM and/or other radio communications technologies, such as, but not limited to ATG radio; AGIS; Aero MACS communications; 3G, 4G, or 5G cellular networks; or NAVCOM avionics radio devices. With respect to SATCOM, various implementations may comprise, but are not limited to Ka, Ku, or L, Iridium devices, or combinations thereof.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

The various illustrative logical or functional blocks and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative blocks and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

What is claimed is:

1. A vehicle communication system comprising:
   a network adaptor configured to communicate with a wireless communication network;
   at least one communication interface configured to communicate with a plurality of aircrafts via a plurality of communication connectivity systems of a vehicle communication network;
   each aircraft comprising an antenna system for communicatively coupling to the plurality of communication connectivity systems; and
   at least one processor communicatively coupled to at least one memory storing executable instructions, the at least one processor configured to execute the executable instructions to:
   receive route data of the plurality of aircrafts, the route data comprising at least a current position of the plurality of aircrafts;
   determine a current state of a first aircraft,
   determine a future position of the first aircraft based on the route data;
   identify a communication connectivity system of the plurality of communication connectivity systems available for communications with the first aircraft at the future position;
   in response to determining that the current state of the first aircraft is level and straight, enable blockage detection, and perform following:
   predict whether an antenna blockage event will occur between the identified communication connectivity system and the antenna system of the first aircraft at the future position;
   designate a beam from the identified communication connectivity system as having the antenna blockage event; and
   filter out the beam designated as having the antenna blockage event; and
   in response to determining that the current state of the first aircraft is not moving, a taxiing state in which the first aircraft is taxiing between an airport terminal and a runway, a climb state in which the first aircraft is climbing in elevation, a descend state in which the first aircraft is descending in elevation, a turn state in which the first aircraft is changing an azimuthal direction, a pitch direction, a roll direction or a yaw direction, do not enable blockage detection and perform the following:
- determine whether there are zero available beams; and
- monitor for available beams to reestablish communications in response to determining that there are zero available beams.

2. The vehicle communication system of claim 1, wherein the at least one processor is further configured to:
- in response to determining the straight and level state, determine the future position of the first aircraft based on the route data.

3. The vehicle communication system of claim 1, wherein the at least one processor is further configured to:
- determine a plurality of future positions with a tracking time window based on the route data;
- identify at least one communication connectivity system for communications with the first aircraft for each of the plurality of future positions;
- for each communication connectivity system and each future position, predict whether an antenna blockage event will occur between the respective communication connectivity system and the antenna system of the first aircraft at the respective future position and predict a time until the respective antenna blockage; and
- only if the predicted time for each antenna blockage event is within a blockage filtering threshold, designate the respective communication connectivity system as having an antenna blockage event.

4. The vehicle communication system of claim 1, wherein the at least one processor is located at ground.

5. The vehicle communication system of claim 1, wherein the antenna blockage event is due to a tail of the first aircraft.

6. The vehicle communication system of claim 1, wherein the plurality of communication connectivity systems is a plurality of satellite systems.

7. The vehicle communication system of claim 1, wherein the at least one processor is further configured to initiate a handover decision, and, during the handover decision,
- determine a plurality of future positions with a tracking time window based on the route data;
- identify at least one communication connectivity system for communications with the first aircraft for each of the plurality of future positions; and
- minimize a number of handovers based on the identified at least one communication connectivity system for each of the plurality of future positions.

8. The system of claim 1, wherein the at least one processor is configured to execute the executable instructions to separately evaluate weighted scores for a forward beam path and a return beam path of the each communication connectivity system.

9. A method for providing a vehicle communication network, the method comprising:
- receiving route data of a plurality of aircrafts, the route data comprising at least a current position of the plurality of aircrafts;
- wherein each aircraft comprises an antenna system for communicatively coupling to a plurality of communication connectivity systems of a vehicle communication network;
- determining a current state of a first aircraft of the plurality of aircrafts;
- determining a future position of the first aircraft based on the route data;
- identifying a communication connectivity system of the plurality of communication connectivity systems available for communications with the first aircraft at the future position;
- in response to determining that the current state of the first aircraft is level and straight, enable blockage detection, and perform following;
- predicting whether an antenna blockage event will occur between the identified communication connectivity system and the antenna system of the first aircraft at the future position;
- designating a beam from the identified communication connectivity system as having the antenna blockage event; and
- filtering out the beam designated as having the antenna blockage event; and
  - in response to determining that the current state of the first aircraft is not moving, a taxiing state in which the first aircraft is taxiing between an airport terminal and a runway, a climb state in which the first aircraft is climbing in elevation, a descend state in which the first aircraft is descending in elevation, a turn state in which the first aircraft is changing an azimuthal direction, a pitch direction, a roll direction or a yaw direction, do not enable blockage detection and perform the following;
  - determine whether there are zero available beams; and
  - monitor for available beams to reestablish communications in response to determining that there are zero available beams.

10. The method of claim 9, further comprising:
- in response to determining the straight and level state, determining the future position of the first aircraft based on the route data.

11. The method of claim 9, further comprising:
- determining a plurality of future positions with a tracking time window based on the route data;
- identifying at least one communication connectivity system for communications with the first aircraft for each of the plurality of future positions;
- for each communication connectivity system and each future position, predicting whether an antenna blockage event will occur between the respective communication connectivity system and the antenna system of the first aircraft at the respective future position and predict a time until the respective antenna blockage; and
- only if the predicted time for each antenna blockage event is within a blockage filtering threshold, designating the respective communication connectivity system as having an antenna blockage event.

12. The method of claim 9, wherein the method is executed by a ground side system.

13. The method of claim 9, wherein the antenna blockage event is due to a tail of the first aircraft.

14. The method of claim 9, wherein the plurality of communication connectivity systems is a plurality of satellite systems.

15. The method of claim 9, further comprising:
- determining a plurality of future positions with a tracking time window based on the route data; and
- minimizing a number of handovers based on the identified at least one communication connectivity system for each of the plurality of future positions.

16. The method of claim 9, further including:
separately evaluating weighted scores for a forward beam path and a return beam path of the each communication connectivity system.

17. The method of claim 16, further including:
determining a forward beam utilization of a given forward beam path by using a ratio of a difference between (a) a maximum forward beam utilization of the given beam and a current utilization of the given beam, and (b) a difference between the maximum forward beam utilization and a lowest forward utilization of all available beams.

18. The method of claim 9, further comprising:
initiating a handover decision; and
during the handover decision,
determining a plurality of future positions with a tracking time window based on the route data;
identifying at least one communication connectivity system for communications with the vehicle for each of the plurality of future positions; and
minimizing a number of handovers based on the identified at least one communication connectivity system for each of the plurality of future positions using hysteresis.

19. A non-transitory computer readable medium having stored therein a program for making a computer execute a method for providing a plurality of aircrafts with communication services over a vehicle communication network, the method of:
receiving route data of the plurality of aircrafts, the route data comprising at least a current position of the plurality of aircrafts;
wherein each aircraft comprises an antenna system for communicatively coupling to a plurality of communication connectivity systems of a vehicle communication network;
determining a current state of a first aircraft;
determining a future position of the first aircraft based on the route data;
identifying a communication connectivity system of the plurality of communication connectivity systems available for communications with the first aircraft at the future position;
in response to determining that the current state of the first aircraft is level and straight, enable blockage detection, and perform following;
predicting whether an antenna blockage event will occur between the identified communication connectivity system and the antenna system of the first aircraft at the future position;
designating a beam from the identified communication connectivity system as having the antenna blockage event; and
filtering out the beam designated as having the antenna blockage event; and
in response to determining that the current state of the first aircraft is not moving, a taxiing state in which the first aircraft is taxiing between an airport terminal and a runway, a climb state in which the first aircraft is climbing in elevation, a descend state in which the first aircraft is descending in elevation, a turn state in which the first aircraft is changing an azimuthal direction, a pitch direction, a roll direction or a yaw direction, do not enable blockage detection and perform the following;
determining whether there are zero available beams; and
monitoring for available beams to reestablish communications in response to determining that there are zero available beams.

20. The non-transitory computer readable medium of claim 19, wherein the method further comprises:
in response to determining the straight and level state, determining the future position of the first aircraft based on the route data.

21. The non-transitory computer readable medium of claim 19, wherein the method further comprises:
determining a plurality of future positions with a tracking time window based on the route data;
identifying at least one communication connectivity system for communications with the vehicle for each of the plurality of future positions;
for each communication connectivity system and each future position, predicting whether an antenna blockage event will occur between the respective communication connectivity system and the antenna system of the first aircraft at the respective future position and predict a time until the respective antenna blockage; and
only if the predicted time for each antenna blockage event is within a blockage filtering threshold, designating the respective communication connectivity system as having an antenna blockage event.

\* \* \* \* \*